(12) United States Patent
Shibata et al.

(10) Patent No.: US 12,703,584 B2
(45) Date of Patent: Aug. 11, 2026

(54) HAND, HOLDING DEVICE, AND CARGO-HANDLING SYSTEM

(71) Applicant: Kabushiki Kaisha Toshiba, Kawasaki-shi (JP)

(72) Inventors: Motojiro Shibata, Yokohama (JP); Yukihiro Ikeya, Yokohama (JP); Toshikazu Taki, Ota (JP); Chiayu Lin, Ota (JP); Takeshi Toyoshima, Yokohama (JP); Hiroaki Fujihara, Kawasaki (JP); Yusuke Mitsuya, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 243 days.

(21) Appl. No.: 17/930,240

(22) Filed: Sep. 7, 2022

(65) Prior Publication Data

US 2023/0075911 A1 Mar. 9, 2023

(30) Foreign Application Priority Data

Sep. 7, 2021 (JP) ................................ 2021-145769

(51) Int. Cl.
*B65G 47/91* (2006.01)

(52) U.S. Cl.
CPC .................................. *B65G 47/91* (2013.01)

(58) Field of Classification Search
CPC ..................................................... B65G 47/91
See application file for complete search history.

(56) References Cited

U.S. PATENT DOCUMENTS

| | | | |
|---|---|---|---|
| 5,044,143 A | 9/1991 | Ako et al. | |
| 11,919,148 B2 * | 3/2024 | Loulavi | B25J 9/1633 |
| 2013/0096713 A1 | 4/2013 | Takizawa et al. | |
| 2015/0360882 A1 * | 12/2015 | Girtman | B25J 11/00 414/796.5 |
| 2016/0137435 A1 | 5/2016 | Tanaka et al. | |
| 2017/0106534 A1 | 4/2017 | Nakamoto et al. | |
| 2017/0107058 A1 | 4/2017 | Nakamoto et al. | |

(Continued)

FOREIGN PATENT DOCUMENTS

| | | |
|---|---|---|
| CN | 206901338 U | 1/2018 |
| CN | 208516524 U * | 2/2019 |

(Continued)

OTHER PUBLICATIONS

Chinese Office: Action issued in Chinese Patent Application No. 202211099441.2 on Mar. 27, 2025, (w/ English translation).

(Continued)

*Primary Examiner* — Gerald McClain
(74) *Attorney, Agent, or Firm* — Oblon, McClelland, Maier & Neustadt, L.L.P.

(57) ABSTRACT

A hand includes a first holding unit, and a second holding unit. The first holding unit includes a plurality of first holding portions capable of holding an article. A plurality of the first holding units is provided in a second direction and is movable independently of each other in a first direction crossing the second direction. The second holding unit is movable in a third direction crossing a plane parallel to the first direction and the second direction. The second holding unit includes a plurality of second holding portions capable of holding the article.

12 Claims, 23 Drawing Sheets

(56) References Cited

U.S. PATENT DOCUMENTS

| | | | | |
|---|---|---|---|---|
| 2018/0207808 | A1 | 7/2018 | Tanaka et al. | |
| 2018/0229987 | A1 | 8/2018 | Kaup | |
| 2020/0377316 | A1 | 12/2020 | Oshikawa | |
| 2021/0069902 | A1 | 3/2021 | Nakamoto et al. | |
| 2021/0101760 | A1 | 4/2021 | Yabe | |
| 2022/0219337 | A1 * | 7/2022 | Shibata | B65G 61/00 |
| 2022/0219922 | A1 * | 7/2022 | Aoyagi | B65G 47/912 |

FOREIGN PATENT DOCUMENTS

| | | | | | |
|---|---|---|---|---|---|
| EP | 3 623 324 | A1 | | 3/2020 | |
| EP | 3 795 510 | A1 | | 3/2021 | |
| JP | 62-141000 | A | | 6/1987 | |
| JP | 2-62303 | A | | 3/1990 | |
| JP | 3-85205 | A | | 4/1991 | |
| JP | 4-217515 | A | | 8/1992 | |
| JP | 4-371500 | A | | 12/1992 | |
| JP | 5-4722 | A | | 1/1993 | |
| JP | 5-10398 | U | | 2/1993 | |
| JP | 7-10278 | A | | 1/1995 | |
| JP | 7-41175 | A | | 2/1995 | |
| JP | 7-251937 | A | | 10/1995 | |
| JP | 8-175799 | A | | 7/1996 | |
| JP | 8-239199 | A | | 9/1996 | |
| JP | 8-268142 | A | | 10/1996 | |
| JP | 9-309697 | A | | 12/1997 | |
| JP | 10-87074 | A | | 4/1998 | |
| JP | 2003-165082 | A | | 6/2003 | |
| JP | 2012-17206 | A | | 1/2012 | |
| JP | 2013-86914 | A | | 5/2013 | |
| JP | 2015040130 | A | * | 3/2015 | |
| JP | 2016-55995 | A | | 4/2016 | |
| JP | 2016055995 | A | * | 4/2016 | B25J 13/00 |
| JP | 2016-94280 | A | | 5/2016 | |
| JP | 2017-52052 | A | | 3/2017 | |
| JP | 2017-149565 | A | | 8/2017 | |
| JP | 2018-118337 | A | | 8/2018 | |
| JP | 2018-521931 | A | | 8/2018 | |
| JP | 2019-94210 | A | | 6/2019 | |
| JP | 2019-218166 | A | | 12/2019 | |
| JP | 2019218165 | A | * | 12/2019 | B25J 15/0052 |
| JP | 2020-1844 | A | | 1/2020 | |
| JP | 2020-40788 | A | | 3/2020 | |
| JP | 2020-192650 | A | | 12/2020 | |
| JP | 2021-41 468 | A | | 3/2021 | |
| JP | 2021-066578 | A | | 4/2021 | |
| JP | 2021-80067 | A | | 5/2021 | |
| JP | 2021-94664 | A | | 6/2021 | |
| JP | 2021-110573 | A | | 8/2021 | |
| JP | 2022-109215 | A | | 7/2022 | |
| JP | 2022-134883 | A | | 9/2022 | |
| WO | WO 2020/158019 | A1 | | 8/2020 | |

OTHER PUBLICATIONS

Office Action issued in Japanese Patent Application No. 2022-142468 on Mar. 27, 2026, with English Translation, citing documents 1-2 therein.

* cited by examiner 21a
21
18
21b
20c
20d
21d
21c
20a
20b
20
20e
22
20f
22d 22c
22b
22a 20e
20f
20a
20b
20c
20d
18
22
22d 22c
22b
22a
20
21c
21d
Z
Y
X 16
16a
16
16c
16d
22
A
22d
22c
22b
22a

Z
Y
X 16
22
22b
16b
C
130
P
A
A 16
22
22b
16b
C
130
P
A
A 16
22
22b
16b
C
130
P
A
A 22
22b
16
16b
C
A
130
P
A
A 22
22b
16
16b
A
C
130
P
A
A 22
22b
16
16b
A
C
130
P
A
A

HAND, HOLDING DEVICE, AND CARGO-HANDLING SYSTEM

CROSS-REFERENCE TO RELATED APPLICATIONS

This application is based upon and claims the benefit of priority from Japanese Patent Application No. 2021-145769, filed on Sep. 7, 2021; the entire contents of which are incorporated herein by reference.

FIELD

Embodiments described herein relate generally to a hand, a holding device, and a cargo-handling system.

BACKGROUND

There is a hand capable of holding an article. The hand holds the article by suction, pinching, or jamming. The hand is required to be capable of stably holding a wider variety of articles.

DETAILED DESCRIPTION

Figure 1:
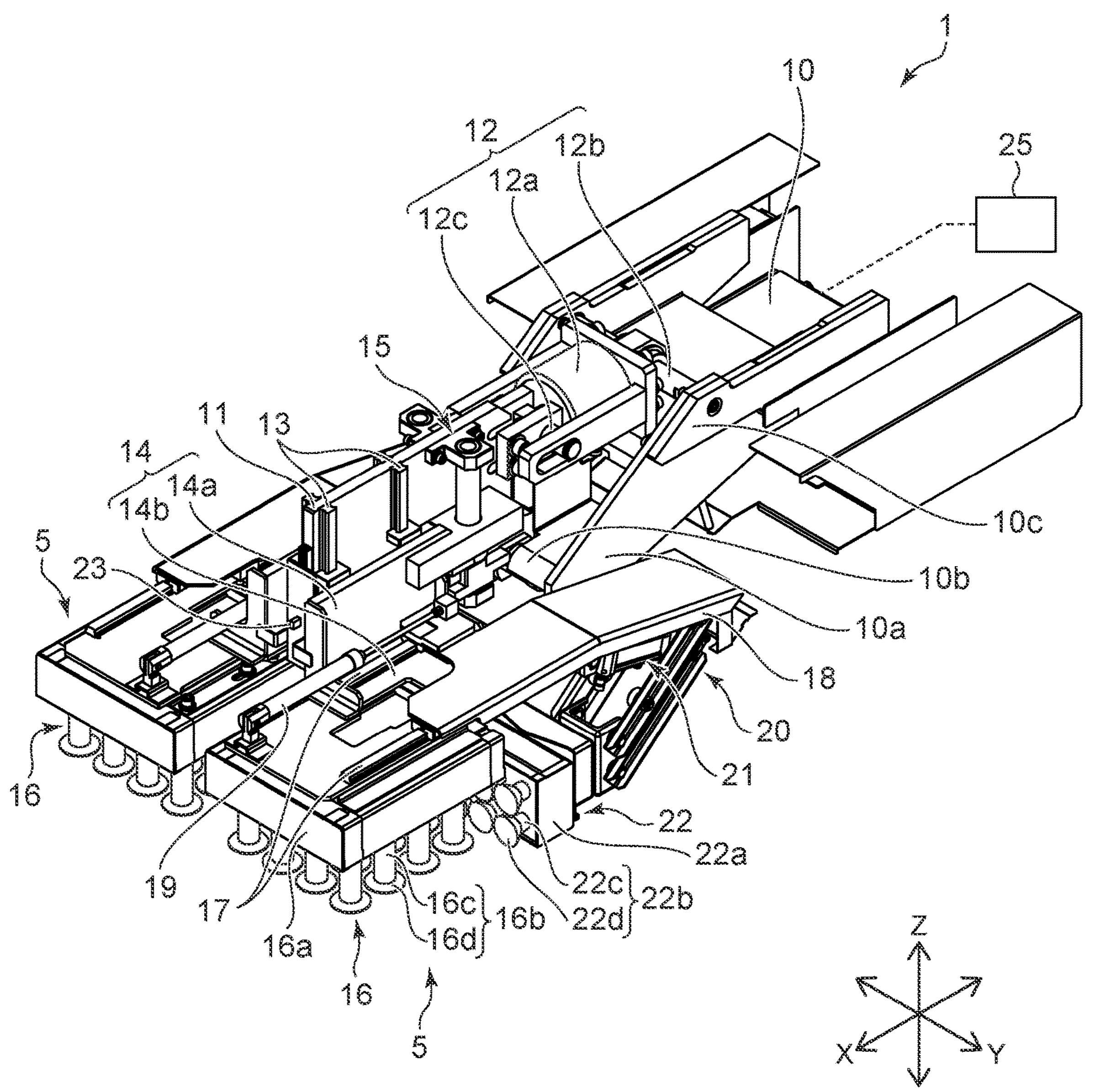
FIG. 1 is a perspective view showing a hand according to an embodiment.

According to one embodiment, a hand includes a first holding unit, and a second holding unit. The first holding unit includes a plurality of first holding portions capable of holding an article. A plurality of the first holding units is provided in a second direction and is movable independently of each other in a first direction crossing the second direction. The second holding unit is movable in a third direction crossing a plane parallel to the first direction and the second direction. The second holding unit includes a plurality of second holding portions capable of holding the article.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Figure 2:
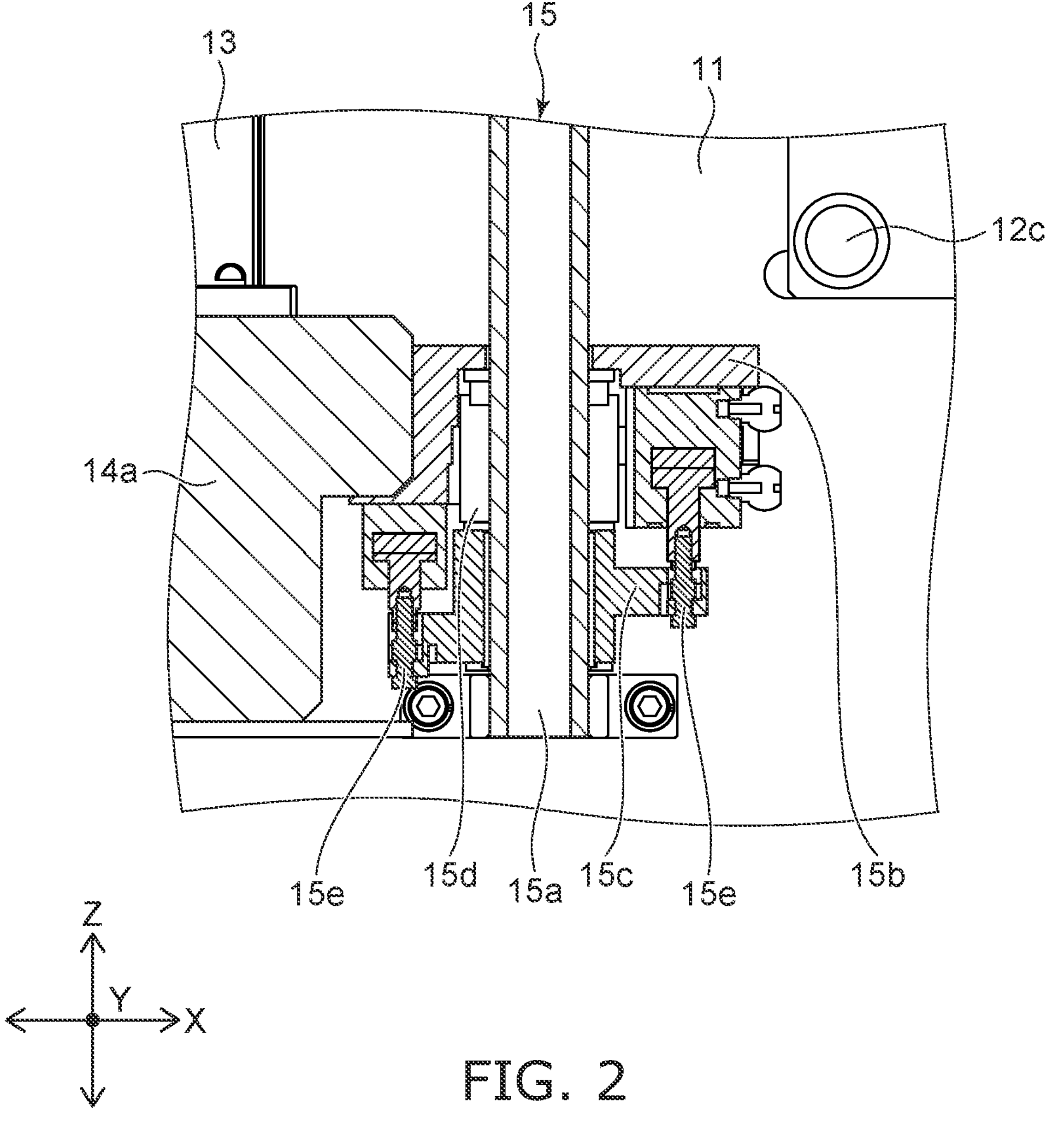
FIG. 2 is a cross-sectional view showing a part of the hand according to the embodiment.
Figure 3:
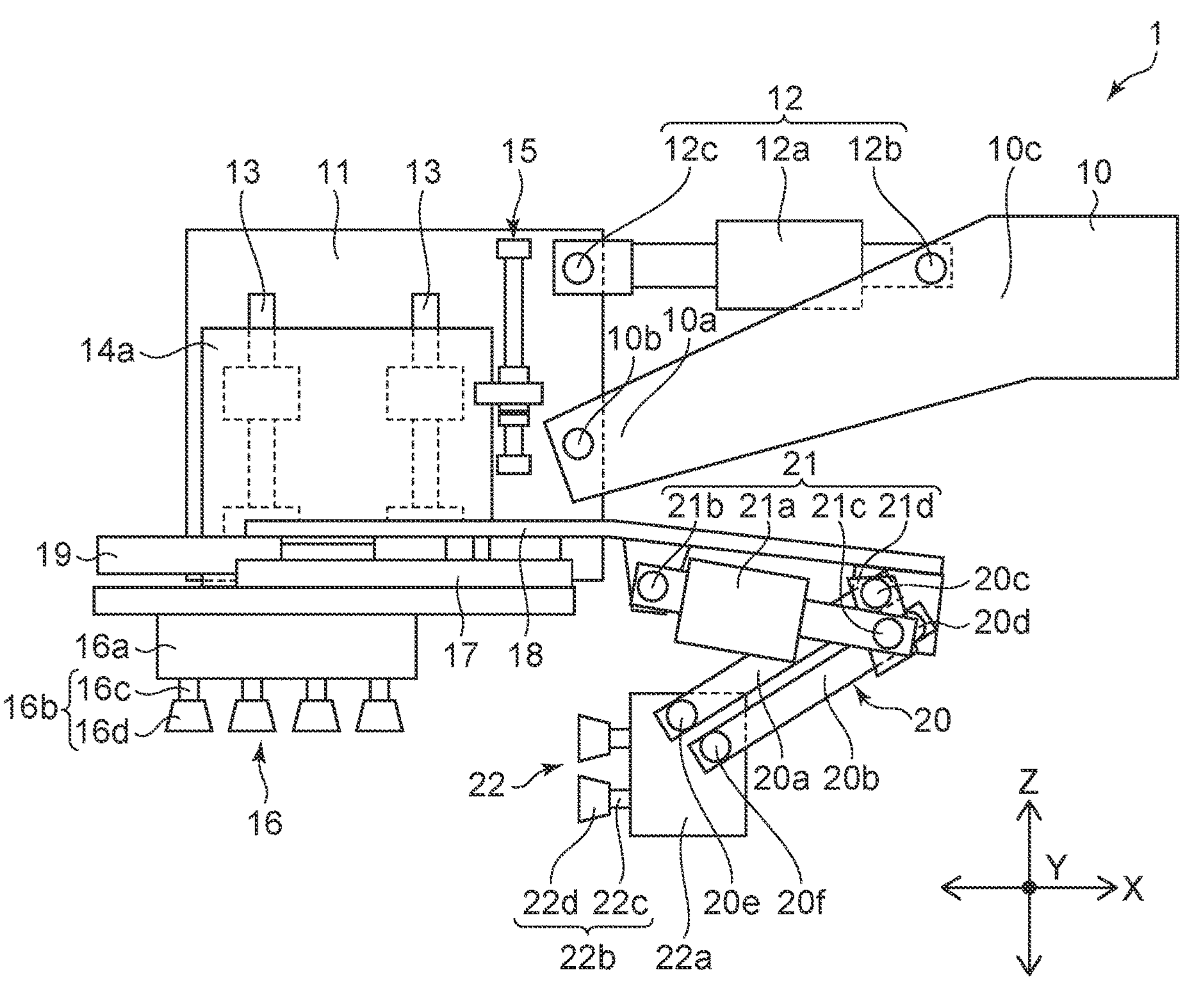
FIG. 3 is a side view schematically showing the hand according to the embodiment.

FIG. 1 is a perspective view showing a hand according to an embodiment. FIG. 2 is a cross-sectional view showing a part of the suction according to the embodiment. FIG. 3 is a side view schematically showing the hand according to the embodiment.

FIGS. 1 to 3 show a suction hand 1 as an example of a hand according to the embodiment. The suction hand 1 holds (stably grips) an article by vacuum suction. As shown in FIG. 1 to FIG. 3, the suction hand 1 includes an arm 10, a base 11, an inclination mechanism 12, a linear guide 13, a connection frame 14, a fixing mechanism 15, an upper surface suction unit 16 (an example of a first holding unit), a linear guide 17, a connection plate 18, a cylinder 19, a link mechanism 20, a drive mechanism 21, a side surface suction unit 22 (an example of a second holding unit), a detector 23, and a control unit 25.

Here, for the sake of description, an X-direction (front-rear direction: third direction), a Y-direction (left-right direction: second direction), and a Z-direction (up-down direction: first direction) are used. The Z-direction is parallel to a direction connecting the upper surface suction unit 16 and an article when the upper surface suction unit 16 suctions the article. The X-direction and the Y-direction cross each other. The Z-direction crosses an X-Y plane. For example, the X-direction and the Y-direction are parallel to a horizontal plane and are orthogonal to each other. The Z-direction is parallel to a vertical direction.

As shown in FIG. 1, the arm 10 extends along the X-direction and supports each constituent element of the suction hand 1. The arm 10 is connected to an external device such as an X-Y orthogonal robot. The arm 10 may also be a part of the external device.

The base 11 is a plate-shaped member extending along an X-Z plane. A rear end of a lower portion of the base 11 is connected to a tip end 10*a* of the arm 10 via a rotation shaft 10*b*, and is rotatable with respect to the tip end 10*a*.

The inclination mechanism 12 is provided between the arm 10 and the base 11. Specifically, the inclination mechanism 12 includes a cylinder 12*a*, a rotation shaft 12*b*, and a rotation shaft 12*c*. The arm 10 includes a bent portion 10*c* that is bent downward. One end of the cylinder 12*a* is connected to the bent portion 10*c* via the rotation shaft 12*b*, and is rotatable with respect to the bent portion 10*c*. The other end of the cylinder 12*a* is connected to a rear end of an upper portion of the base 11 via the rotation shaft 12*c*, and is rotatable with respect to the rear end. Rotation centers of the rotation shafts 10*b*, 12*b*, and 12*c* are parallel to the Y-direction.

The cylinder 12*a* can extend and contract along the X-direction. A height at which the cylinder 12*a*, the rotation shaft 12*b*, and the rotation shaft 12*c* are provided is different from a height at which the rotation shaft 10*b* is provided. Accordingly, when a length of the cylinder 12*a* changes, an angle of the base 11 around the Y-direction changes. In the suction hand 1, the cylinder 12*a*, the rotation shaft 12*b*, and the rotation shaft 12*c* are located above the rotation shaft 10*b*. For example, as the cylinder 12*a* extends, a front end of the base 11 is inclined downward.

The linear guide 13 is provided on a side surface of the base 11. In the suction hand 1, two linear guides 13 are provided on one side surface of the base 11. The linear guide 13 includes a rail and a block. The rail is fixed to the base 11 and is provided along the Z-direction. The block is movable in the Z-direction along the rail.

The connection frame 14 includes a vertical frame portion 14*a* extending along the X-Z plane and a horizontal frame portion 14*b* extending along the X-Y plane. One end of the horizontal frame portion 14*b* in the Y-direction is connected to a lower end of the vertical frame portion 14*a*. The vertical frame portion 14*a* is fixed to the block of the linear guide 13. Accordingly, the connection frame 14 is movable in the Z-direction with respect to the base 11.

The fixing mechanism 15 is provided on the side surface of the base 11 so as to be close to the vertical frame portion 14*a*. The fixing mechanism 15 can switch between a locked state in which the connection frame 14 is fixed and an unlocked state in which the connection frame 14 is movable. FIG. 2 shows an X-Z cross section passing through the fixing mechanism 15. As shown in FIG. 2, the fixing mechanism 15 includes a rod 15*a*, a fixed plate 15*b*, a movable plate 15*c*, a clamper 15*d*, and a cylinder 15*e*.

The rod 15*a* is fixed to the base 11 and extends along the Z-direction. The fixed plate 15*b* is a plate-shaped member extending along the X-Y plane, and is fixed to the connection frame 14. The movable plate 15*c* is a plate-shaped member extending along the X-Y plane, and is attached to the fixed plate 15*b* via the clamper 15*d* and the cylinder 15*e*. In the unlocked state, the fixed plate 15*b*, the movable plate 15*c*, the clamper 15*d*, and the cylinder 15*e* are slidable with respect to the rod 15*a*. When the connection frame 14 moves along the Z-direction, the fixed plate 15*b*, the movable plate 15*c*, the clamper 15*d*, and the cylinder 15*e* also move along the Z-direction.

The cylinder 15*e* can extend and contract along the Z-direction. When the cylinder 15*e* extends or contracts, the movable plate 15*c* moves in the Z-direction with respect to the fixed plate 15*b*. When a distance between the fixed plate 15*b* and the movable plate 15*c* is increased by the operation of the cylinder 15*e*, a component of the clamper 15*d* is pressed toward the rod 15*a*. Accordingly, positions of the fixed plate 15*b*, the movable plate 15*c*, the clamper 15*d*, and the cylinder 15*e* in the Z-direction are fixed. As a result, a position of the connection frame 14 in the Z-direction is fixed. When the distance between the fixed plate 15*b* and the movable plate 15*c* is decreased, the pressing of the component of the clamper 15*d* toward the rod 15*a* is released. Accordingly, the fixed plate 15*b*, the movable plate 15*c*, the clamper 15*d*, and the cylinder 15*e* are movable. As a result, the connection frame 14 is movable in the Z-direction.

As shown in FIG. 1, the upper surface suction unit 16 is fixed to the horizontal frame portion 14*b* of the connection frame 14. The upper surface suction unit 16 includes a housing 16*a* and multiple suction portions 16*b* (an example of a first holding portions). Each suction portion 16*b* includes a rod 16*c* (first rod) and a suction pad 16*d* (first suction pad). The rod 16*c* extends along the Z-direction. For example, the rod 16*c* is fixed to the housing 16*a*. The rod 16*c* may also be slidable in the Z-direction with respect to the housing 16*a*. In this case, the upper surface suction unit 16 is further provided with a clamper configured to fix the rod 16*c*. The suction pad 16*d* has flexibility and is provided at a tip end of the rod 16*c*. Spaces are provided inside the rod 16*c* and inside the suction pad 16*d*, and these spaces communicate with each other.

The multiple suction portions 16*b* are arranged along two directions crossing each other. A suction face of the suction pad 16*d* is parallel to a direction in which the multiple suction portions 16*b* are arranged. In the suction hand 1, the multiple suction portions 16*b* are arranged along the X-direction and the Y-direction. The number of the suction portions 16*b*, a size of each suction portion 16*b*, an interval between the suction portions 16*b*, and the like are appropriately designed according to an article to be held.

A pipe or the like configured to connect an exhaust system (not shown) and the multiple suction portions 16*b* is provided inside the housing 16*a*. By an operation of the exhaust system, the inside of each suction pad 16*d* is collectively depressurized with respect to one upper surface suction unit 16.

The linear guide 17 is provided along an upper surface of the housing 16*a*. In the suction hand 1, one linear guide 17 is provided on the upper surface of the housing 16*a*, and another linear guide 17 is provided on an upper surface of the horizontal frame portion 14*b*. Each linear guide 17 includes a rail and a block. The rail is fixed to the horizontal frame portion 14*b* and the housing 16*a*, and extends along the X-direction. The block is movable in the X-direction along the rail.

The connection plate 18 is a plate-shaped member extending along the X-direction. A front portion of the connection plate 18 is parallel to the X-Y plane and is fixed to the block of each linear guide 17. Accordingly, the connection plate 18 is movable in the X-direction with respect to the upper surface suction unit 16. A rear portion of the connection plate 18 is slightly inclined downward.

The cylinder 19 moves the side surface suction unit 22 in the X-direction with respect to the upper surface suction unit 16. Specifically, as shown in FIG. 1 and FIG. 3, a tube body of the cylinder 19 is fixed to the housing 16*a*. A piston of the cylinder 19 is fixed to the connection plate 18. The cylinder 19 can extend and contract along the X-direction. When the cylinder 19 extends or contracts, the connection plate 18 moves in the X-direction with respect to the upper surface suction unit 16. Accordingly, the side surface suction unit 22 connected to the connection plate 18 moves along the X-direction.

The link mechanism 20 is connected between the connection plate 18 and the side surface suction unit 22. As shown in FIG. 3, the link mechanism 20 includes a pair of links 20*a* and 20*b*. The links 20*a* and 20*b* extend parallel to each other and are rotatable in synchronization with each other. One end of the link 20*a* and one end of the link 20*b* are connected to a rear end of the connection plate 18 via rotation shafts 20*c* and 20*d*, respectively. The rotation shafts 20*c* and 20*d* are rotatable with respect to the connection plate 18. Meanwhile, the links 20*a* and 20*b* are fixed to the rotation shafts 20*c* and 20*d*, respectively. Therefore, when the rotation shafts 20*c* and 20*d* rotate with respect to the connection plate 18, the links 20*a* and 20*b* also rotate.

The drive mechanism 21 is connected to the connection plate 18 and the link mechanism 20, and changes a position of the side surface suction unit 22 in the Z-direction. Specifically, the drive mechanism 21 includes a cylinder 21*a*, a rotation shaft 21*b*, a rotation shaft 21*c*, and a bar 21*d*. The cylinder 21*a* is provided along the rear portion of the connection plate 18. A tube body of the cylinder 21*a* is connected to the connection plate 18 via the rotation shaft 21*b*, and is rotatable with respect to the connection plate 18. A piston of the cylinder 21*a* is connected to one end of the bar 21*d* via the rotation shaft 21*c*, and is rotatable with respect to the bar 21*d*. The other end of the bar 21*d* is fixed to one of the rotation shafts 20*c* and 20*d*. In the suction hand 1, the bar 21*d* is fixed to the rotation shaft 20*c*. The side surface suction unit 22 is connected to the other end of the link 20*a* and the other end of the link 20*b* via rotation shafts 20*e* and 20*f*, respectively, and is rotatable with respect to the links 20*a* and 20*b*.

Figure 4A:
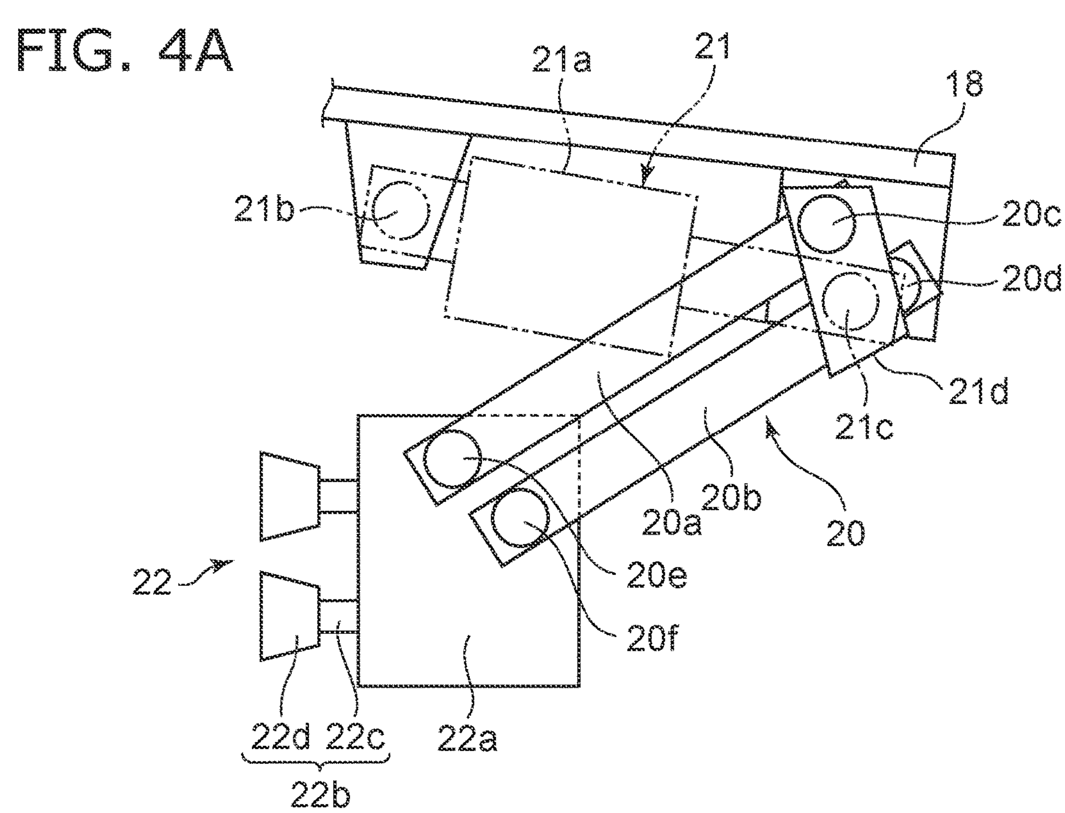
FIGS. 4A and 4B are side views schematically showing an operation of the hand according to the embodiment.
Figure 4B:
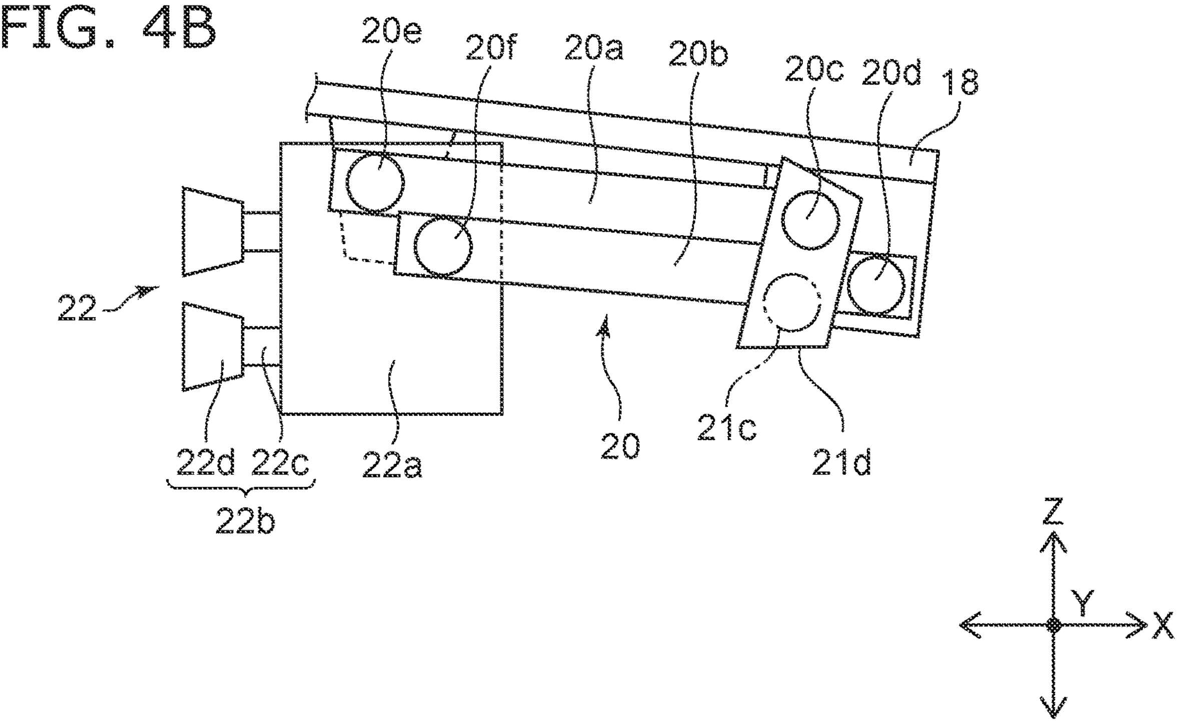

FIGS. 4A and 4B are side views schematically showing an operation of the suction hand according to the embodiment. In FIG. 4A, the cylinder 21*a*, the rotation shaft 21*b*, and the rotation shaft 21*c* are shown by broken lines. In FIG. 4B, the cylinder 21*a* and the rotation shaft 21*b* are omitted, and the rotation shaft 21*c* is shown by a broken line.

The rotation shafts 20*c* to 20*f*, 21*b*, and 21*c* are parallel to the Y-direction. As shown in FIGS. 4A and 4B, when the cylinder 21*a* extends or contracts, the bar 21*d* rotates around the Y-direction about the rotation shaft 20*c*. Since the bar 21*d* is fixed to the rotation shaft 20*c*, the rotation shaft 20*c* rotates in accordance with the rotation of the bar 21*d*. The link 20*a* fixed to the rotation shaft 20*c* rotates around the Y-direction about the rotation shaft 20*c*. The link 20*b* also rotates around the Y-direction in synchronization with the link 20*a*. Accordingly, the side surface suction unit 22 rotates around the Y-direction about the rotation shaft 20*c*. The position of the side surface suction unit 22 in the X-Z plane can be changed by an operation of the drive mechanism 21. For example, the position of the side surface suction unit 22 is switched according to an arrangement of the article to be held by the suction hand 1.

The side surface suction unit 22 includes a housing 22*a* and multiple suction portions 22*b* (an example of a second holding portions). Each suction portion 22*b* includes a rod 22*c* (second rod) and a suction pad 22*d* (second suction pad). The rod 22*c* extends along the X-direction. For example, the rod 22*c* is fixed to the housing 22*a*. The rod 22*c* may also be slidable in the X-direction with respect to the housing 22*a*. In this case, the side surface suction unit 22 is further provided with a clamper configured to fix the rod 22*c*. The suction pad 22*d* has flexibility and is provided at a tip end of the rod 22*c*. Spaces are provided inside the rod 22*c* and inside the suction pad 22*d*, and these spaces communicate with each other.

The multiple suction portions 22*b* are arranged along two directions crossing each other. A suction face of the suction pad 22*d* is parallel to a direction in which the multiple suction portions 22*b* are arranged. In the suction hand 1, the multiple suction portions 22*b* are arranged along the Y-direction and the Z-direction. The number of the suction portions 22*b*, a size of each suction portion 22*b*, an interval between the suction portions 22*b*, and the like are appropriately designed according to the article to be held.

A pipe or the like configured to connect the exhaust system (not shown) and the multiple suction portions 22*b* is provided inside the housing 22*a*. By the operation of the exhaust system, the inside of each suction pad 22*d* is collectively depressurized with respect to one side surface suction unit 22. Pressure control on the side surface suction unit 22 is executed independently of pressure control on the upper surface suction unit 16.

The detector 23 is fixed to the base 11. The detector 23 detects lifting of the connection frame 14 with respect to the base 11. Based on a detection signal from the detector 23, it can be determined whether the upper surface suction unit 16 is in contact with the article. For example, the detector 23 includes one or more sensors selected from an optical sensor, a proximity sensor, a distance measuring sensor, and a transmissive sensor. The detector 23 may also be provided at a place other than the shown place. For example, the detector 23 may be provided in the upper surface suction unit 16, and may more directly detect approaching of the article with respect to the upper surface suction unit 16.

Figure 5:
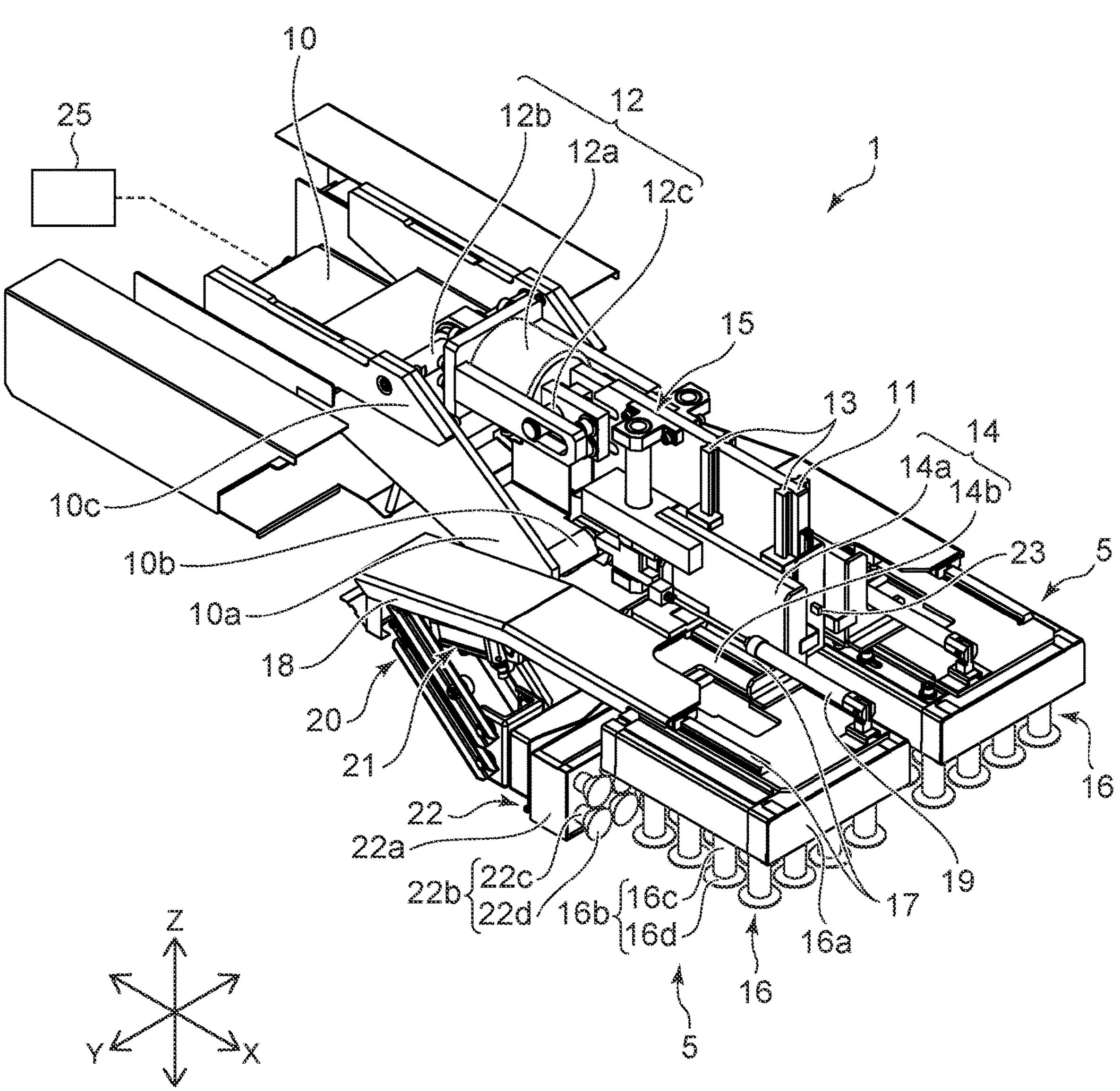
FIG. 5 is a perspective view showing the hand according to the embodiment.

FIG. 5 is a perspective view showing the hand according to the embodiment.

FIG. 5 shows a state when the suction hand 1 is viewed from a direction different from that of FIG. 1. The direction in which the suction hand 1 is viewed in FIG. 5 is substantially symmetrical to the direction in which the suction hand 1 is viewed in FIG. 1 with respect to the X-Z plane passing through a center of the suction hand 1 in the Y-direction. As shown in FIG. 1 and FIG. 5, suction mechanisms 5 each including the linear guide 13, the connection frame 14, the fixing mechanism 15, the upper surface suction unit 16, the linear guide 17, the connection plate 18, the cylinder 19, the link mechanism 20, the drive mechanism 21, and the side surface suction unit 22 are provided on two side surfaces of the base 11. Therefore, for example, multiple upper surface suction units 16 and multiple side surface suction units 22 are provided in the Y-direction.

Figure 6:
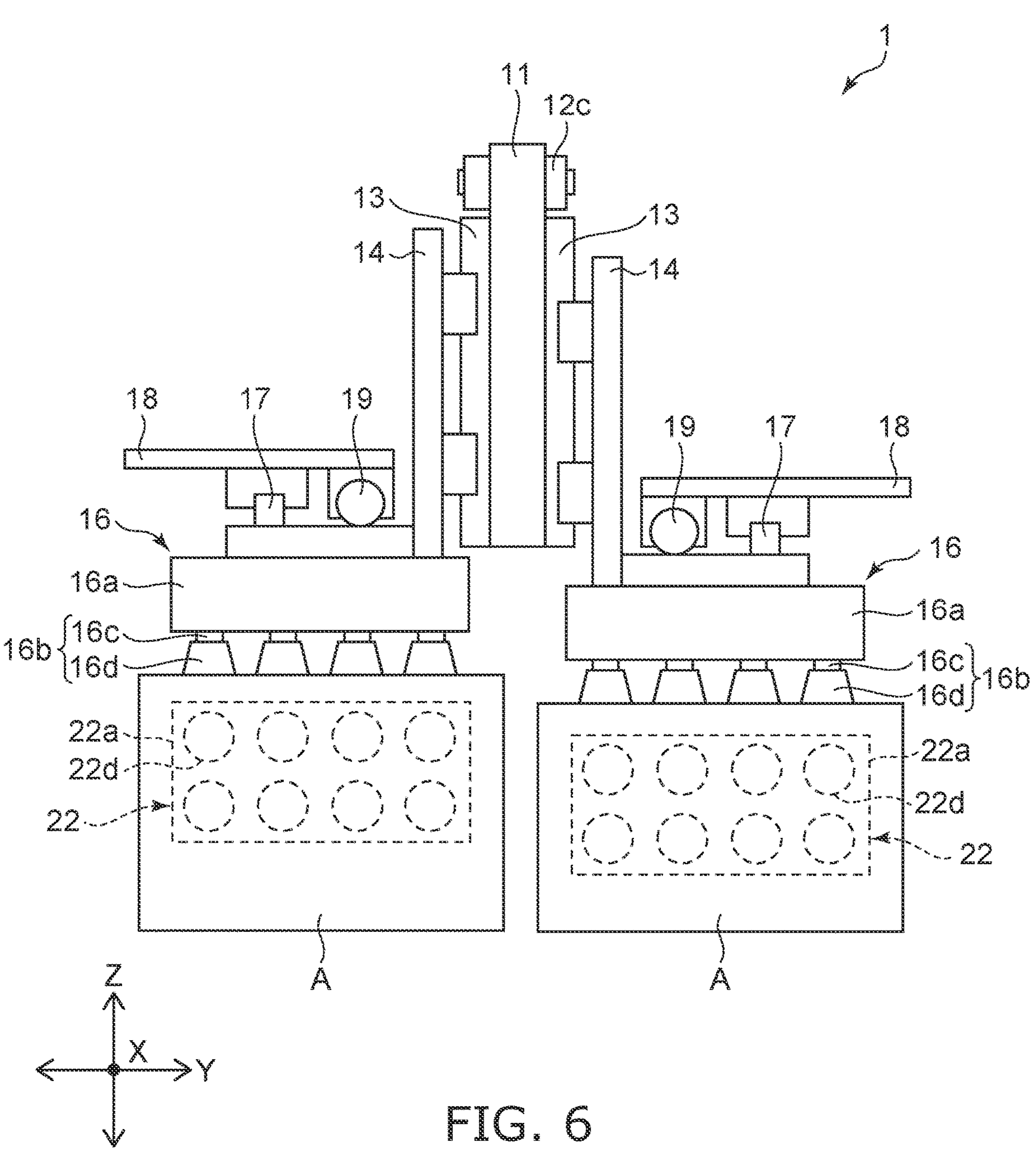
FIG. 6 is a front view schematically showing a state when the hand according to the embodiment holds the article.
Figure 7:
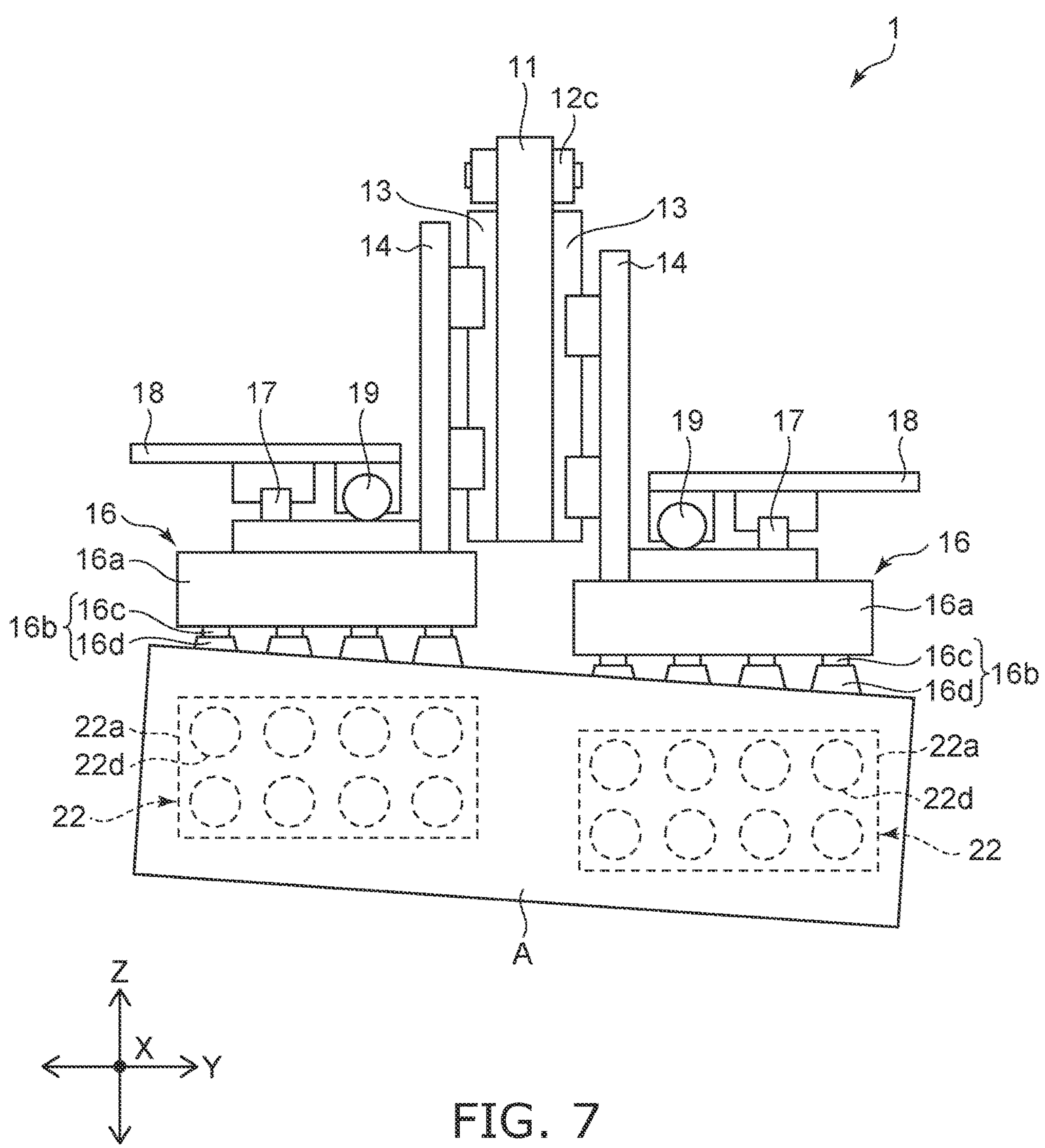
FIG. 7 is a front view schematically showing a state when the hand according to the embodiment holds the article.

FIGS. 6 and 7 are front views schematically showing a state when the hand according to the embodiment holds the article.

The suction mechanisms 5 are movable independently of each other. Further, the cylinders 19 and 21*a* shown in FIGS. 3 and 4 are provided for each suction mechanism 5. The cylinders 19 and 21*a* can operate independently for each suction mechanism 5. Therefore, as shown in FIGS. 6 and 7, positions of the upper surface suction units 16 in the Z-direction may be different from each other. The positions of the respective side surface suction units 22 in the X-Z plane may be different from each other.

As shown in FIG. 6, multiple suction mechanisms 5 may hold multiple articles A, respectively. As shown in FIG. 7, multiple suction mechanisms 5 may hold one article A. As an example, a shape of the article A to be suctioned is a rectangular parallelepiped shape as shown in FIGS. 6 and 7. An upper surface of the article A may also be inclined with respect to the X-Y plane. Even when the upper surface of the article is inclined, each suction pad 22*d* is deformed according to a position of the upper surface, so that the article can be stably held. In particular, even when the inclination of the upper surface of the article is large, a position of each suction mechanism 5 in the Z-direction changes according to the upper surface and each suction pad 22*d* is deformed according to the position of the upper surface as shown in FIG. 7, so that the article can be stably held.

The control unit 25 controls each constituent element of the suction hand 1. For example, the control unit 25 operates the cylinders 12*a*, 15*e*, 19, and 21*a*. In addition, the control unit 25 controls the exhaust system configured to exhaust each of the upper surface suction unit 16 and the side surface suction unit 22.

The cylinders 12*a*, 15*e*, 19, and 21*a* are air cylinders (an example of actuators). Other actuators may also be provided instead of the cylinders 12*a*, 15*e*, 19, and 21*a*. For example, a motor and a mechanical element that converts rotational motion of the motor into linear motion may be provided.

FIGS. 8A to 8D are side views schematically showing a state when the hand according to the embodiment holds the article.

Figures 8A, 8B, 8C, 8D:
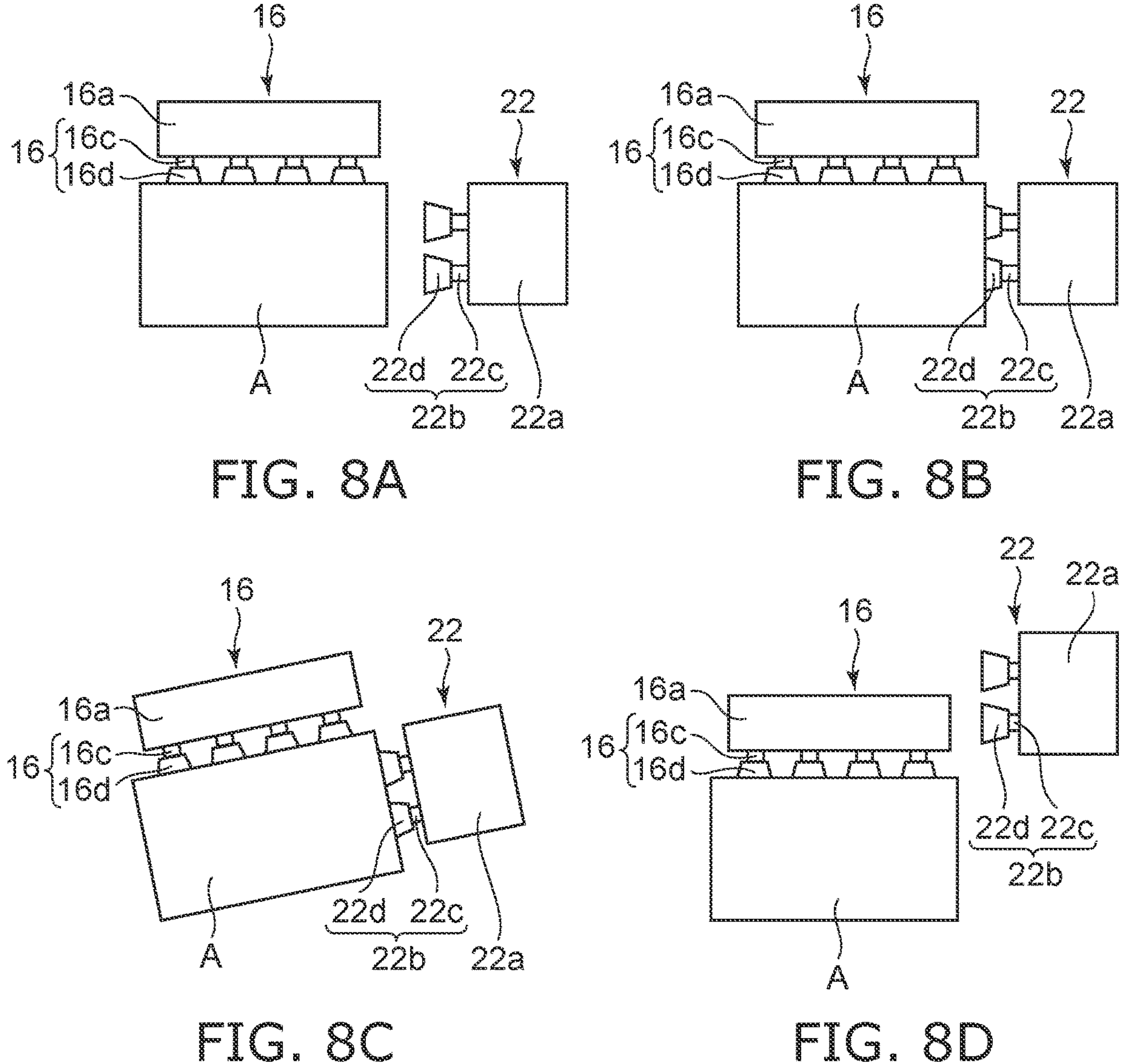
FIGS. 8A to 8D are side views schematically showing a state when the hand according to the embodiment holds the article.

When the article is suctioned, as shown in FIG. 8A, the upper surface suction unit 16 comes into contact with the upper surface of the article A and suctions the upper surface. Next, as shown in FIG. 8B, the side surface suction unit 22 is brought into contact with a side surface of the article A by an operation of the cylinder 19. The side surface suction unit 22 suctions the side surface. The suction hand 1 holds the article A by the suction of the upper surface and the side surface of the article A.

Subsequently, the suction hand 1 is lifted. At this time, when the cylinder 12*a* is opened or thrust of the cylinder 12*a* is weak, the cylinder 12*a* extends due to weight of the suction mechanism 5 and the article A. Accordingly, as shown in FIG. 8C, the upper surface suction unit 16 and the side surface suction unit 22 are inclined with respect to the X-Y plane in a state where the article A is held. If the inclination is too large, contents of the article A may collapse. Therefore, an inclination angle with respect to the X-Y plane is favorably larger than 0° and less than 15°.

For example, an adhesive for attaching a label, an adhesive of a packing tape, or the like may be adhered to the upper surface of the article A. There may be a case where the upper surface of another article A is stuck to a bottom surface of the held article A by the adhesive. By being inclined, the held article A can be easily peeled off from the other article A. Accordingly, when the article A is conveyed, friction between the conveyed article A and the other article A can be reduced.

As shown in FIG. 8D, the suction hand 1 can also hold the article A by causing only the upper surface suction unit 16 to suction the upper surface of the article A. At this time, the side surface suction unit 22 is located at the same height as the upper surface suction unit 16 or above at least a part of the upper surface suction unit 16. Thereafter, similarly to FIG. 8C, the upper surface suction unit 16 may be inclined with respect to the X-Y plane in the state where the article A is held.

Figure 9A:
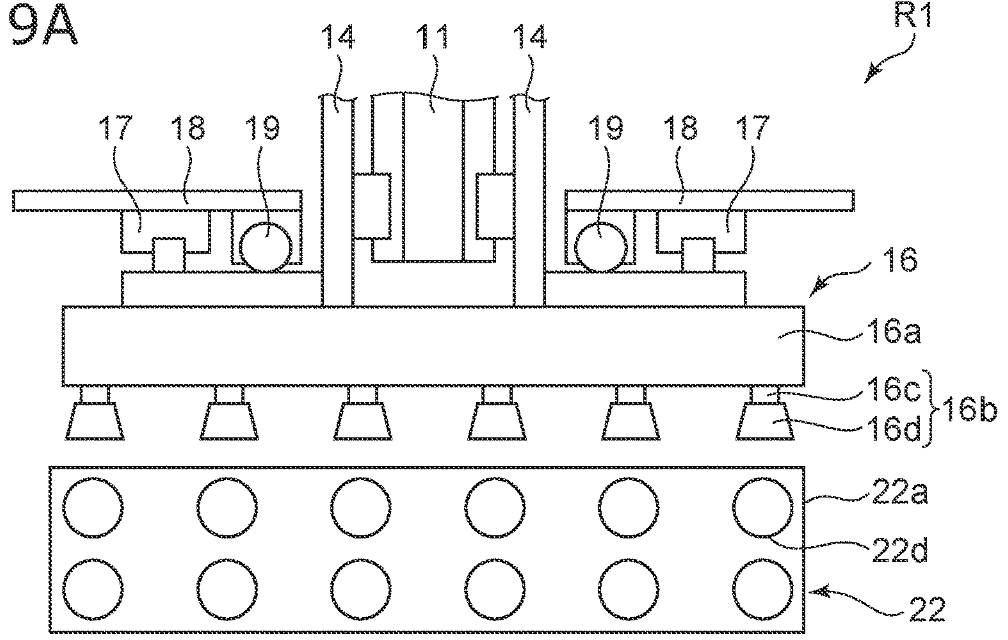
FIGS. 9A and 9B are front views schematically showing a hand according to a reference example.
Figure 9B:
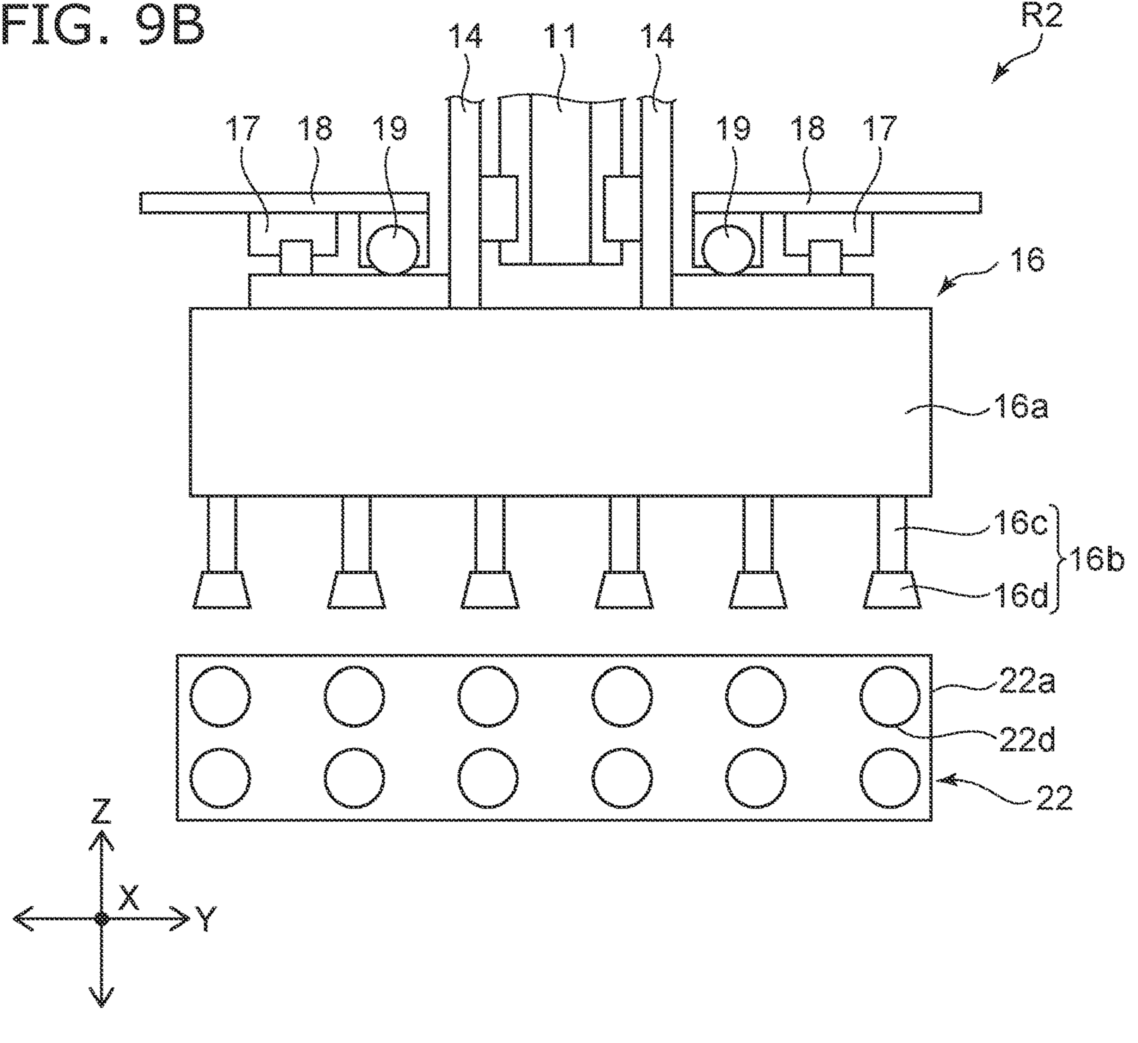

FIGS. 9A and 9B are front views schematically showing a hand according to a reference example.

Advantages of the embodiment will be described with reference to FIGS. 9A and 9B. A suction hand R1 shown in FIG. 9A includes one upper surface suction unit 16 elongated in the Y-direction and one side surface suction unit 22 elongated in the Y-direction. According to the suction hand R1, a large article can be stably held. On the other hand, it is difficult for the suction hand R1 to hold multiple articles having different heights as shown in FIG. 6. In addition, it is difficult for the suction hand R1 to hold an article whose upper surface is largely inclined with respect to the X-Y plane as shown in FIG. 7.

Similarly to the suction hand R1, a suction hand R2 shown in FIG. 9B includes one upper surface suction unit 16 elongated in the Y-direction and one side surface suction unit 22 elongated in the Y-direction. In addition, each suction portion 16*b* of the upper surface suction unit 16 includes a rod 16*c* longer than that of the suction hand R1. According to the suction hand R2, each rod 16*c* slides in the Z-direction according to the position of the upper surface of the article. Accordingly, the article whose upper surface is inclined can be stably held. On the other hand, since a slidable distance of the rod 16*c* is increased, the upper surface suction unit 16 is increased in size. As a result, size and weight of the suction hand R2 are increased.

In the suction hand 1 according to the embodiment, the multiple upper surface suction units 16 are provided. Each of the upper surface suction units 16 includes the multiple suction portions 16*b* and is movable independently of each other in the Z-direction. As shown in FIG. 7, even when the article A whose upper surface is inclined is suctioned, each upper surface suction unit 16 moves in the Z-direction according to the position of the upper surface of the article A, so that the article A can be stably held. As shown in FIG. 6, each of the upper surface suction units 16 can also suction articles A having different heights. In addition, since each upper surface suction unit 16 is movable in the Z-direction, a length of the rod 16*c* can be shortened, and thus the increase in the size of the upper surface suction unit 16 can be prevented. According to the embodiment, a wider variety of articles can be stably held while the increase in the size of the upper surface suction unit 16 is prevented.

In addition, in the suction hand 1, the side surface suction unit 22 is connected to the upper surface suction unit 16 via the connection plate 18 and the link mechanism 20. The position of the side surface suction unit 22 in the Z-direction changes according to the position of the upper surface suction unit 16 in the Z-direction. Therefore, variation in the position of the upper surface suction unit 16 in the Z-direction with respect to the side surface suction unit 22 can be prevented, and thus the side surface suction unit 22 can be more stably suctioned to the side surface of the article.

Favorably, for each of the upper surface suction units 16, starting or ending of the suction to the multiple suction portions 16*b* is collectively controlled. For example, internal spaces of the multiple rods 16*c* communicate with a common internal space of the housing 16*a*, and starting or ending of exhaust is performed with respect to the internal space of the housing 16*a*. The upper surface suction unit 16 is provided with a pressure gauge configured to measure a pressure of the internal space, and the suction is controlled based on a measurement value of the pressure gauge. Accordingly, a structure of the upper surface suction unit 16 can be simplified as compared with a case where a pressure of each suction portion 16*b* is individually controlled. For example, the suction portions 16*b* can be disposed at a higher density, and a holding force of the upper surface suction unit 16 and stability of the holding can be improved.

Similarly, for each of the side surface suction units 22, it is favorable that starting or ending of the suction to the multiple suction portions 22*b* is collectively controlled. For example, internal spaces of the multiple rods 22*c* communicate with a common internal space of the housing 22*a*, and starting or ending of exhaust is performed with respect to the internal space of the housing 22*a*. The side surface suction unit 22 is provided with a pressure gauge configured to measure a pressure of the internal space, and the suction is controlled based on a measurement value of the pressure gauge. Accordingly, a structure of the side surface suction unit 22 can be simplified as compared with a case where a pressure of each suction portion 22*b* is individually controlled. For example, the suction portions 22*b* can be disposed at a higher density, and a holding force of the side surface suction unit 22 and stability of the holding can be improved.

In addition, according to the suction hand 1 according to the embodiment, positions of the multiple suction portions 16*b* can be collectively fixed by fixing the position of the upper surface suction unit 16 by the fixing mechanism 15. Accordingly, the structure can be simplified as compared with a case where the positions of the suction portions 16*b* are individually fixed. For example, the suction portions 16*b* can be disposed at a higher density, and the holding force of the upper surface suction unit 16 and the stability of the holding can be improved.

Figure 10:
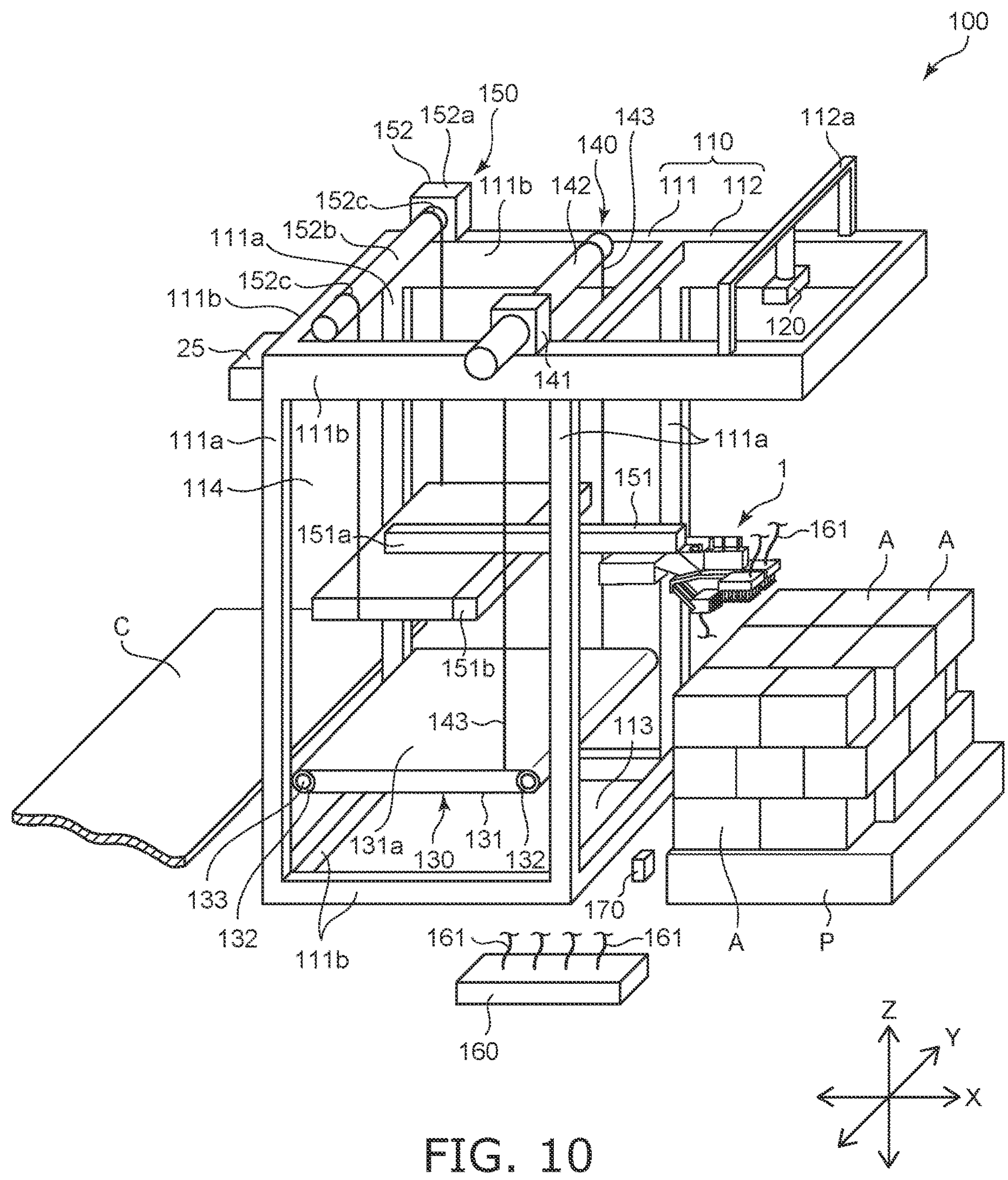
FIG. 10 is a perspective view schematically showing a holding device according to the embodiment.

FIG. 10 is a perspective view schematically showing a holding device according to the embodiment.

A holding device 100 according to the embodiment is used in a site such as a warehouse where a cargo-handling operation is performed. A conveyor C (conveying device) that conveys the article A is provided adjacent to the holding device 100. In addition, a pallet P, on which the articles A are placed in a stacked manner, is placed adjacent to the holding device 100. The holding device 100 is located between the conveyor C and the pallet P. The holding device 100 holds the articles A placed in the stacked manner on the pallet P. For example, the holding device 100 functions as a cargo-handling system that sequentially takes out the articles A from the pallet P and conveys the articles A to the conveyor C.

As shown in FIG. 10, the holding device 100 includes the suction hand 1, the control unit 25, a support frame 110, an image-capturing device 120, a conveyor 130, a lifting-and-lowering device 140, a moving device 150, a negative pressure generating device 160, and a detector 170.

The support frame 110 supports each constituent element of the holding device 100. The image-capturing device 120 captures an image of the article A placed on the pallet P from above. The conveyor 130 conveys the article A conveyed into the support frame 110 toward the conveyor C. The lifting-and-lowering device 140 lifts or lowers the conveyor 130. The moving device 150 moves the suction hand 1 between the pallet P and the conveyor 130. The negative pressure generating device 160 generates a negative pressure in the suction portion 16*b* of the upper surface suction unit 16 and the suction portion 22*b* of the side surface suction unit 22. The detector 170 detects a height of a bottom surface of the article A held by the suction hand 1.

Hereinafter, a specific example of each constituent element of the holding device 100 will be described in detail.

The support frame 110 constitutes an outer shell of the holding device 100 and is fixed to a floor surface. The support frame 110 includes a body portion 111 and a protruding portion 112. The body portion 111 has a rectangular parallelepiped shape. The conveyor 130 is provided inside the body portion 111. The body portion 111 includes an opening 113 facing the pallet P and an opening 114 facing the conveyor C. The article A is conveyed from the pallet P to the conveyor 130 through the opening 113. In addition, the article A is conveyed from the conveyor 130 to the conveyor C through the opening 114.

The body portion 111 includes, for example, four vertical frames 111*a* and multiple horizontal frames 111*b* that respectively connect upper ends and lower ends of the four vertical frames 111*a*.

The protruding portion 112 is attached to a front side of an upper portion of the body portion 111 and protrudes forward. The protruding portion 112 is located above the pallet P. The protruding portion 112 includes a support portion 112*a* that supports the image-capturing device 120.

The image-capturing device 120 is fixed to the support portion 112*a*. The image-capturing device 120 transmits an acquired image (still image) to the control unit 25. The image-capturing device 120 may also acquire a moving image and cut out the still image from the moving image. The control unit 25 detects a dimension of the article A, a height of the upper surface of the article A, and the like from the acquired image. The control unit 25 and the image-capturing device 120 function as a detection device that detects information on the conveyed article A.

The conveyor 130 includes a belt 131, pulleys 132, and a motor 133. The belt 131 is an endless belt wound around a pair of the pulleys 132 mutually distal in the X-direction. One end of the belt 131 is adjacent to the conveyor C. A rotation axis of each pulley 132 is parallel to the Y-direction. The motor 133 drives the belt 131 by rotating one of the pair of pulleys 132. Accordingly, the article A placed on the conveyor 130 is conveyed toward the conveyor C.

The lifting-and-lowering device 140 includes a drive unit 141, a shaft 142, and a wire 143. The drive unit 141 is attached to an upper end of the body portion 111. The shaft 142 extends along the Y-direction and is connected to the drive unit 141. The wire 143 is wound around the shaft 142. One end of the wire 143 is connected to the conveyor 130. The drive unit 141 rotates the shaft 142. By winding or spreading the wire 143 in accordance with the rotation of the shaft 142, the conveyor 130 moves along the Z-direction.

The moving device 150 includes a horizontal moving device 151 and a lifting-and-lowering device 152. The horizontal moving device 151 moves the suction hand 1 along the X-Y plane. The lifting-and-lowering device 152 lifts or lowers the horizontal moving device 151. Accordingly, the suction hand 1 connected to the horizontal moving device 151 moves along the Z-direction.

The horizontal moving device 151 includes an arm 151*a* and a support portion 151*b*. The arm 151*a* is connected to the arm 10 of the suction hand 1 and is extendable and contractible along the X-direction. By an operation of the arm 151*a*, the suction hand 1 can be moved along the X-direction. The support portion 151*b* extends along the Y-direction and movably supports the arm 151*a* from below. The support portion 151*b* moves the arm 151*a* along the Y-direction. By an operation of the support portion 151*b*, the suction hand 1 can be moved along the Y-direction. The arm 151*a* and the support portion 151*b* are each operated by an actuator such as a motor or an air cylinder.

The lifting-and-lowering device 152 includes a drive unit 152*a*, a shaft 152*b*, and a wire 152*c*. The drive unit 152*a* is attached to the upper end of the body portion 111. The shaft 152*b* extends along the Y-direction and is connected to the drive unit 152*a*. The wire 152*c* is wound around the shaft 152*b*. One end of the wire 152*c* is connected to the horizontal moving device 151. The drive unit 152*a* rotates the shaft 152*b*. By winding or spreading the wire 152*c* in accordance with the rotation of the shaft 152*b*, the horizontal moving device 151 moves along the Z-direction.

The negative pressure generating device 160 is capable of individually adjusting a pressure of each of the multiple upper surface suction units 16 and each of the multiple side surface suction units 22. The negative pressure generating device 160 includes multiple pipes 161 respectively connected to the multiple upper surface suction units 16 and the multiple side surface suction units 22. In addition, the negative pressure generating device 160 includes a vacuum pump, an ejector, a valve, and the like (not shown).

The detector 170 is provided, for example, between the body portion 111 and the pallet P. The detector 170 detects a height position of the bottom surface of the article A passing above. The detector 170 transmits a detection result to the control unit 25. The detector 170 includes a distance measuring sensor (for example, a laser range finder).

The control unit 25 controls an operation of each constituent element described above. For example, the control unit 25 is electrically connected to the suction hand 1, the image-capturing device 120, the conveyor 130, the lifting-and-lowering device 140, the moving device 150, the negative pressure generating device 160, and the detector 170. The control unit 25 controls, based on the image acquired by the image-capturing device 120 and the detection result of the detector 170, the suction hand 1, the conveyor 130, the lifting-and-lowering device 140, the moving device 150, and the negative pressure generating device 160.

An operation of the holding device 100 will be described.

The control unit 25 switches between a first state in which the side surface suction unit 22 is located at a first position and a second state in which the side surface suction unit 22 is located at a second position. For example, the switching of the state is executed according to an arrangement of the articles A on the pallet P, a command from a host system, an operation by a user, an image-capturing result of the image-capturing device 120, or the like.

FIG. 4A shows the state in which the side surface suction unit 22 is located at the first position. The side surface suction unit 22 can hold the side surface of the article at the first position. When the side surface suction unit 22 is located at the first position, the side surface suction unit 22 is located below at least a part of the upper surface suction unit 16. For example, the suction portion 22*b* is located below upper ends of the housing 16*a* and the rod 16*c* of the upper surface suction unit 16.

FIG. 4B shows the state in which the side surface suction unit 22 is located at the second position. The second position is above the first position. When the side surface suction unit 22 is located at the second position, the side surface suction unit 22 is located above at least a part of the upper surface suction unit 16. For example, the suction portion 22*b* is located above the suction portion 16*b* of the upper surface suction unit 16.

The holding device 100 performs a first operation when conveying articles in a first arrangement. In the first operation, the position of the side surface suction unit 22 is set to the first position. The holding device 100 performs a second operation when conveying articles in a second arrangement. In the second operation, the position of the side surface suction unit 22 is set to the second position. In the first arrangement, articles having substantially the same size are arranged in the X-direction and the Y-direction and placed in a stacked manner in the Z-direction. The positions of the upper surfaces of the multiple articles A arranged in the same stage are substantially the same. In the second arrangement, sizes of the articles are irregular. The positions of the upper surfaces of the articles A adjacent to each other in the X-Y plane may be different from each other.

Figure 11:
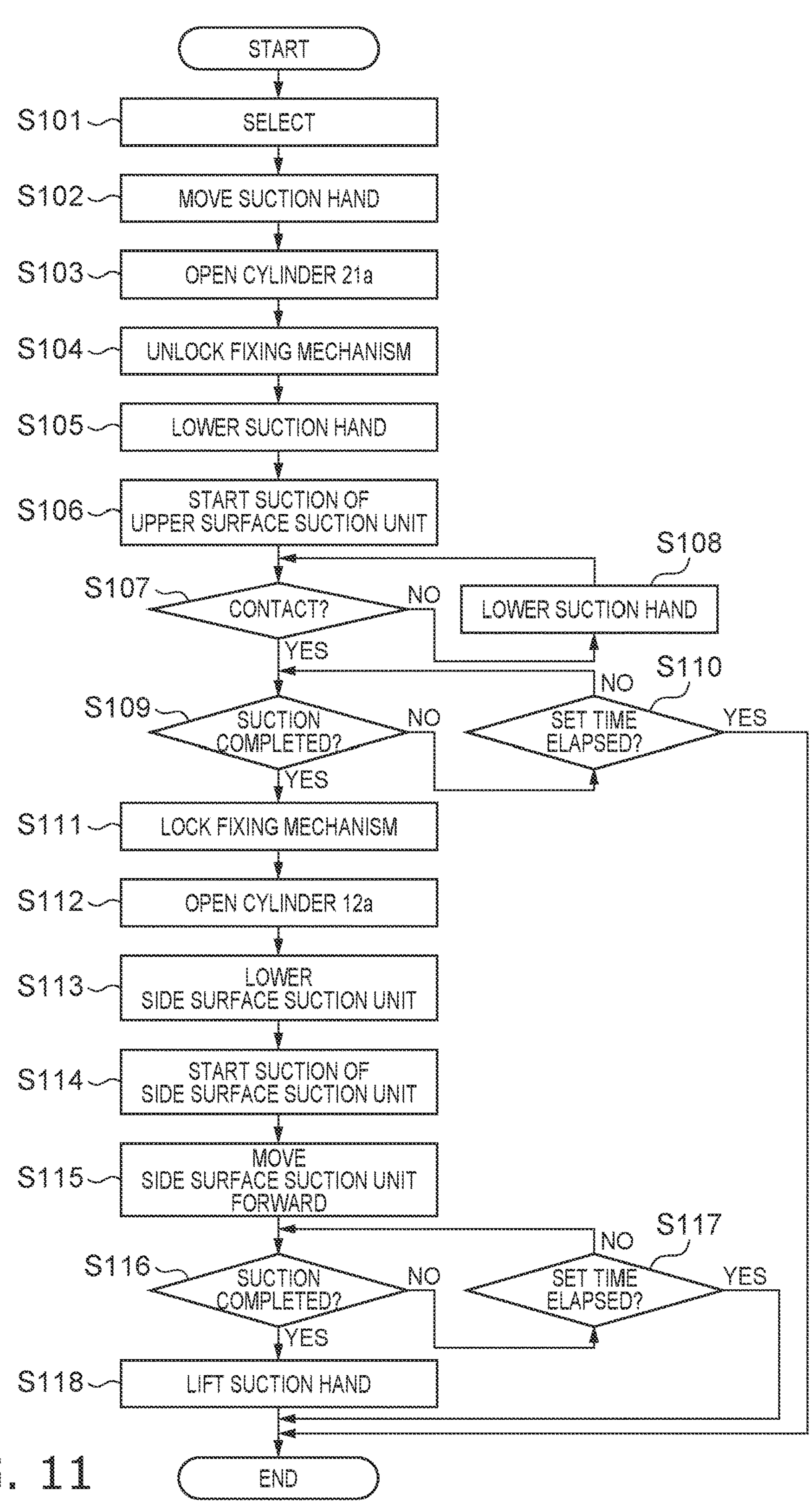
FIG. 11 is a flowchart showing a part of the first operation.
Figure 12:
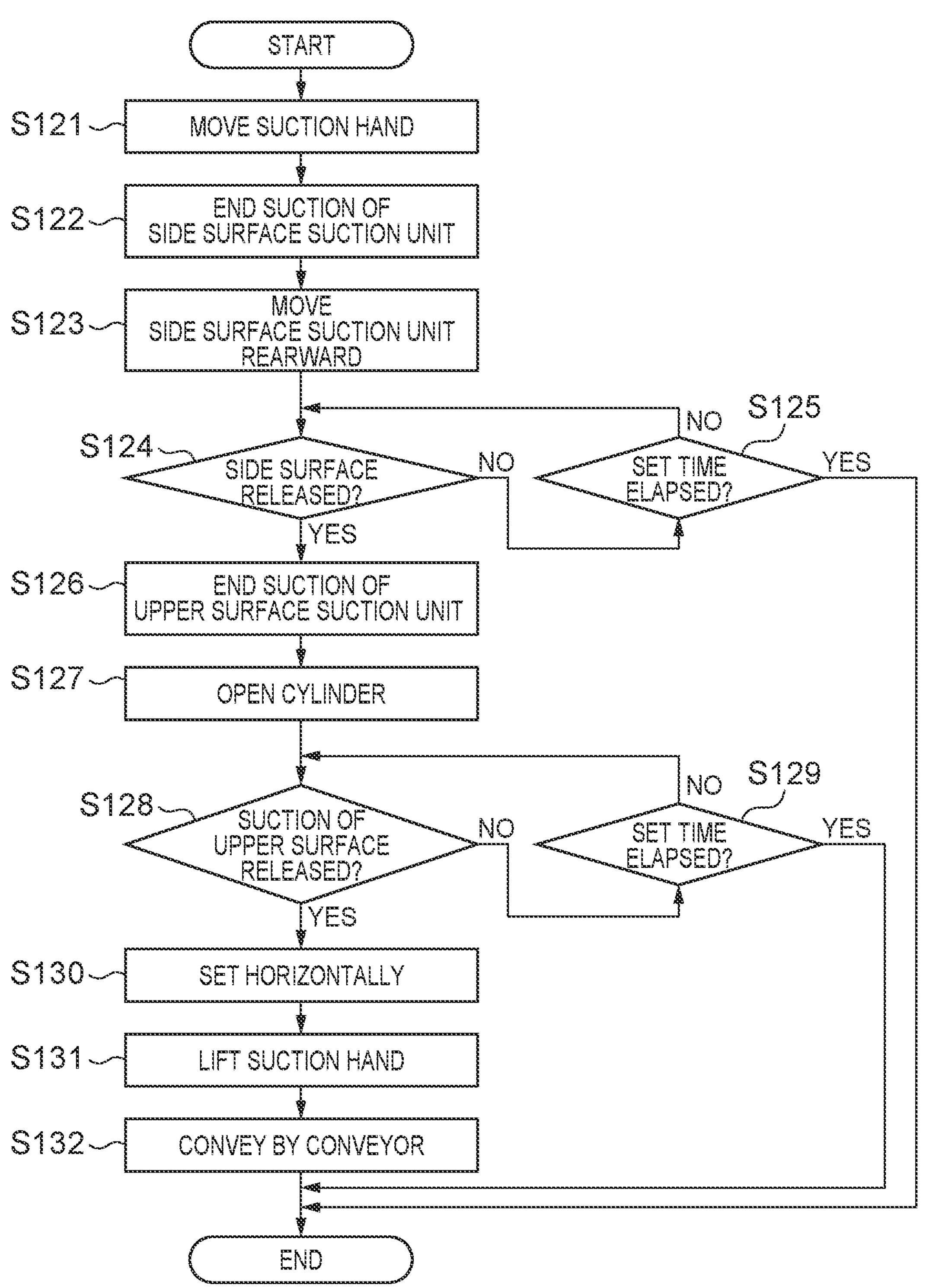
FIG. 12 is a flowchart showing another part of the first operation.

FIG. 11 is a flowchart showing a part of the first operation. FIG. 12 is a flowchart showing another part of the first operation. FIGS. 13A to 13C, FIGS. 14A to 14C, and FIGS. 15A to 15C are schematic views showing the first operation.

The first operation of the holding device 100 will be described with reference to FIGS. 11 to 15C.

Figure 13A:
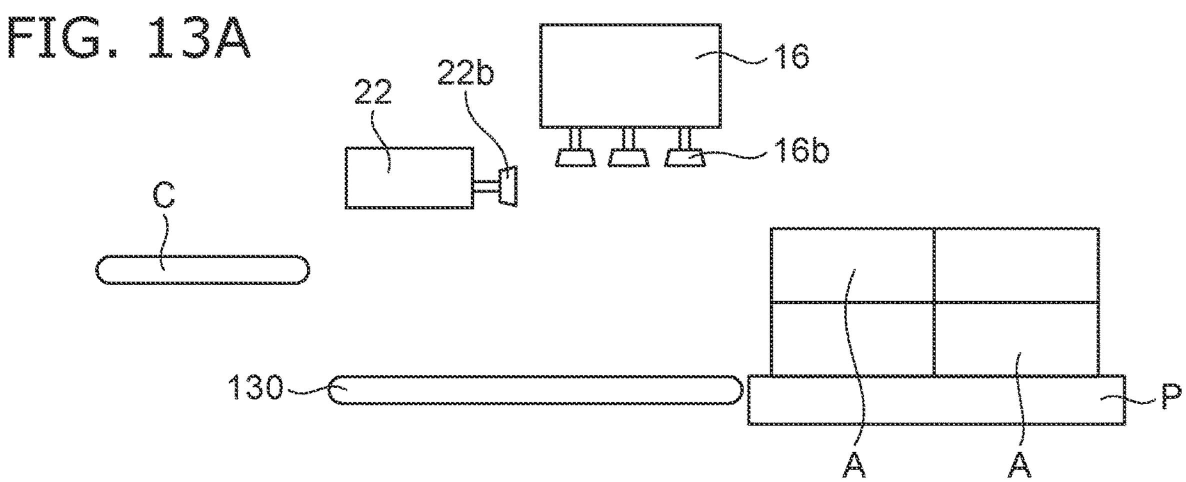
FIGS. 13A to 13C are schematic views showing the first operation.
Figure 13B:
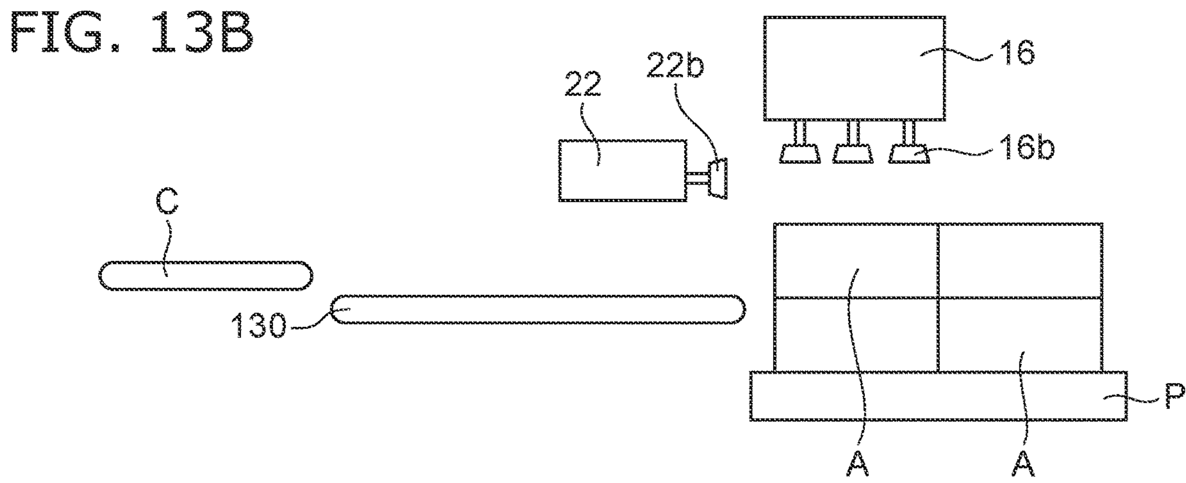

First, the image-capturing device 120 captures an image of the multiple articles A on the pallet P. In the example shown in FIG. 13A, the multiple articles A in the first arrangement are placed in a stacked manner on the pallet P. Based on the obtained image, the control unit 25 selects an article to be held (step S101 in FIG. 11). In the first operation, the article A that is closest to the conveyor 130 in the X-direction and whose upper surface is located at a highest position is selected. The horizontal moving device 151 moves the suction hand 1 along the X-Y plane (step S102), and positions the suction hand 1 above the selected article A as shown in FIG. 13B. In addition, a position of the conveyor 130 in the Z-direction is set to the same position as the bottom surface of the held article A.

Figure 13C:
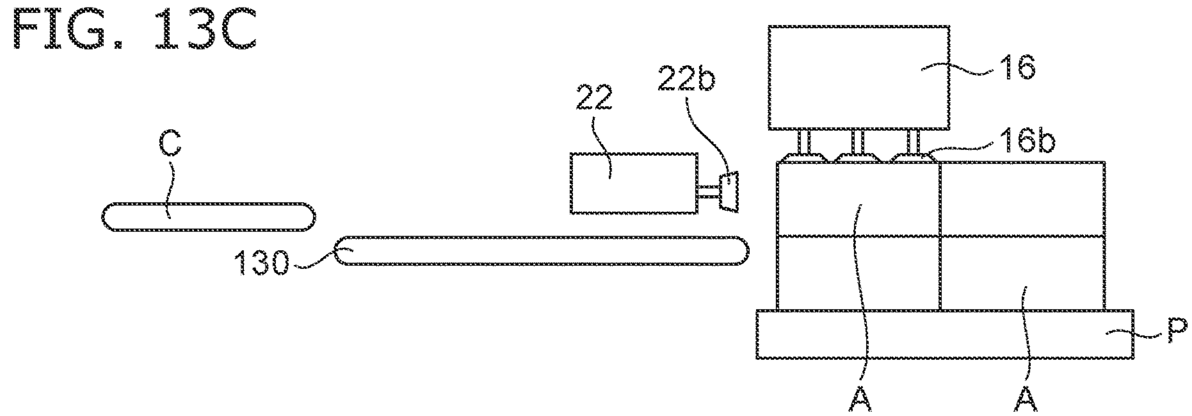

The cylinder 21*a* of the drive mechanism 21 is opened (step S103). That is, no force is applied from the cylinder 21*a* to the link mechanism 20, and the side surface suction unit 22 is in a movable state. The fixing mechanism 15 is set to the unlocked state (step S104), and the connection frame 14 is in a movable state. As shown in FIG. 13C, the lifting-and-lowering device 152 lowers the suction hand 1 toward the article A (step S105). The suction hand 1 is lowered to the position of the upper surface of the selected article A. The position of the upper surface of the article A is calculated by the control unit 25 based on the image.

During the lowering of the suction hand 1, the upper surface suction unit 16 is movable in the Z-direction with respect to the base 11. Accordingly, when the upper surface suction unit 16 comes into contact with the article A, it is possible to prevent an excessive force from being applied to the upper surface suction unit 16. In addition, when the side surface suction unit 22 unintentionally comes into contact with another article or the like when the cylinder 21*a* is opened during the lowering of the suction hand 1, the side surface suction unit 22 can move according to the contact. Accordingly, it is possible to prevent an excessive force from being applied to the side surface suction unit 22.

The upper surface suction unit 16 starts suction of the upper surface of the article A (step S106). Specifically, the control unit 25 operates the negative pressure generating device 160 to exhaust the inside of the suction portion 16*b*. The control unit 25 determines whether the upper surface suction unit 16 is in contact with the article A (step S107). The contact is determined based on the detection signal of the detector 23. Alternatively, the contact may be determined based on the pressure of the suction portion 16*b*. From step S106, the suction (decompression) by the upper surface suction unit 16 has already been started. Therefore, when the upper surface suction unit 16 is in contact with the article A, the pressure of the suction portion 16*b* decreases. When the pressure is lower than a preset threshold value, it may be determined that the upper surface suction unit 16 is in contact with the article A. When it is determined that the upper surface suction unit 16 is not in contact with the article A, the lifting-and-lowering device 152 lowers the suction hand 1 again (step S108). After the execution of step S108, step S107 is executed again.

A limit may be set for the number of times of execution of step S108. As an example, the number of times of execution of step S108 is set to "1". That is, even if it is determined that the upper surface suction unit 16 is not in contact with the article A after step S108 is executed once, step S108 is not executed for a second time. The control unit 25 may notify abnormality of the holding device 100 instead of executing step S108 for the second time. Accordingly, for example, even when the detection result of the detector 23 is incorrect and it is erroneously determined that the upper surface suction unit 16 is not in contact with the article A, it is possible to prevent the upper surface suction unit 16 from being excessively pressed against the article A.

Alternatively, it is possible to prevent the upper surface suction unit 16 from continuing to be lowered to an erroneous position. When it is determined that the upper surface suction unit 16 is in contact with the article A, the control unit 25 determines whether the suction of the article A by the upper surface suction unit 16 is completed (step S109). Whether the suction is completed is determined based on the pressure in the suction portion 16*b*. When the pressure in at least a part of the multiple suction portions 16*b* is lower than a preset threshold value, it is determined that the suction is completed.

When it is determined that the suction is not completed, the suction by the upper surface suction unit 16 is continued. The control unit 25 determines whether a preset time has elapsed from the start of the suction (step S110). When the suction is not completed even after the set time has elapsed, the control unit 25 ends the first operation. The control unit 25 may notify that the suction by the upper surface suction unit 16 is not completed.

When the suction is completed, the fixing mechanism 15 is set to the locked state (step S111), and the position of the upper surface suction unit 16 in the suction hand 1 is fixed. The cylinder 12*a* of the inclination mechanism 12 is opened (step S112). Accordingly, the upper surface suction unit 16 and the side surface suction unit 22 are in a state of being inclinable with respect to the X-Y plane.

The drive mechanism 21 lowers the side surface suction unit 22 by an operation of the cylinder 21*a* (step S113). Fluid is injected into the cylinder 21*a*, and the position of the side surface suction unit 22 is fixed with respect to the upper surface suction unit 16. The side surface suction unit 22 starts suction (step S114). Specifically, the control unit 25 operates the negative pressure generating device 160 to exhaust the inside of the suction portion 22*b*.

Figure 14A:
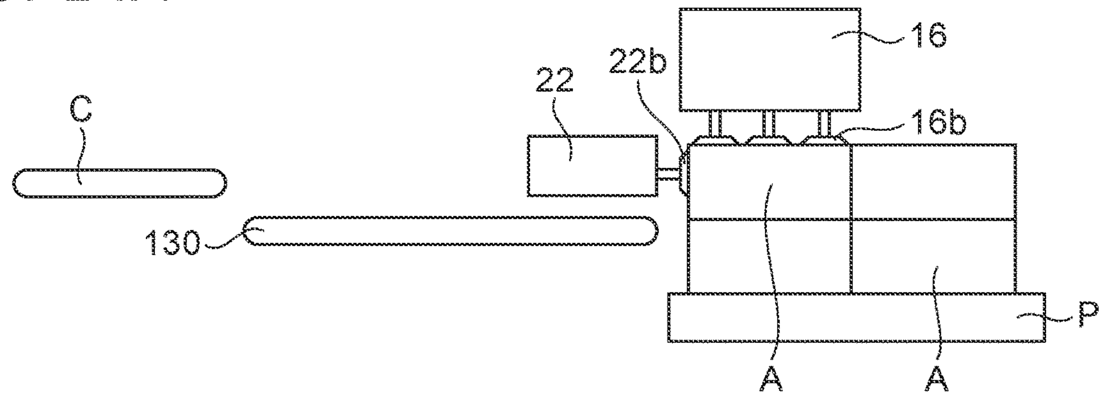
FIGS. 14A to 14C are schematic views showing the first operation.

The cylinder 19 moves the side surface suction unit 22 forward (step S115). When a position of the suction hand 1 with respect to the article A is appropriate, the side surface suction unit 22 comes into contact with the side surface of the article A as shown in FIG. 14A. The control unit 25 determines whether the suction of the article A by the side surface suction unit 22 is completed (step S116). Whether the suction is completed is determined based on the pressure in the suction portion 22*b*. When the pressure in at least a part of the multiple suction portions 22*b* is lower than a preset threshold value, it is determined that the suction is completed.

When it is determined that the suction is not completed, the suction by the side surface suction unit 22 is continued. The control unit 25 determines whether a preset time has elapsed from the start of the suction (step S117). When the suction is not completed even after the set time has elapsed, the control unit 25 ends the first operation. The control unit 25 may notify that the suction by the side surface suction unit 22 is not completed.

Figure 14B:
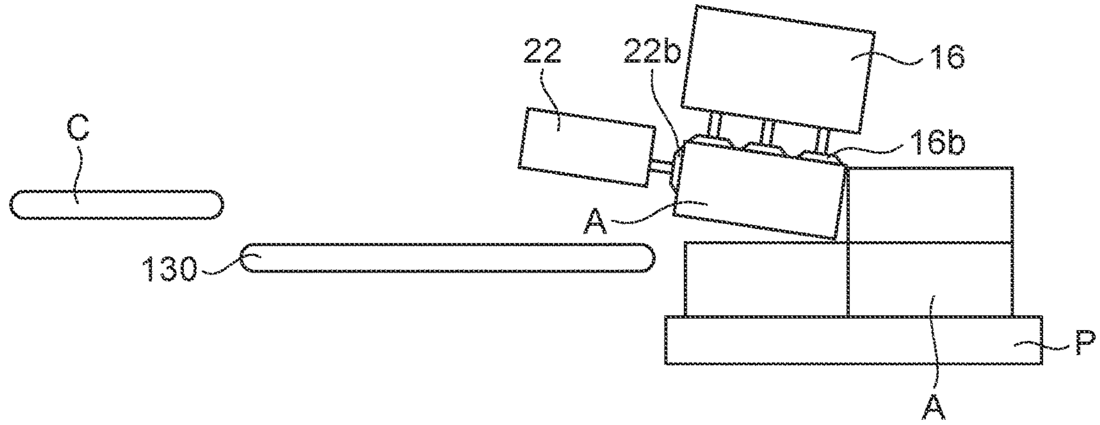

When the suction is completed, the lifting-and-lowering device 152 slightly lifts the suction hand 1 (step S118). At this time, since the cylinder 12*a* of the inclination mechanism 12 is opened, the cylinder 12*a* extends due to the weight of the suction mechanism 5 and the article A. As shown in FIG. 14B, the upper surface suction unit 16 and the side surface suction unit 22 are inclined with respect to the X-Y plane. Accordingly, for example, only one side of the held article A is in contact with another article A below. A contact area between the articles A can be reduced.

Figure 14C:
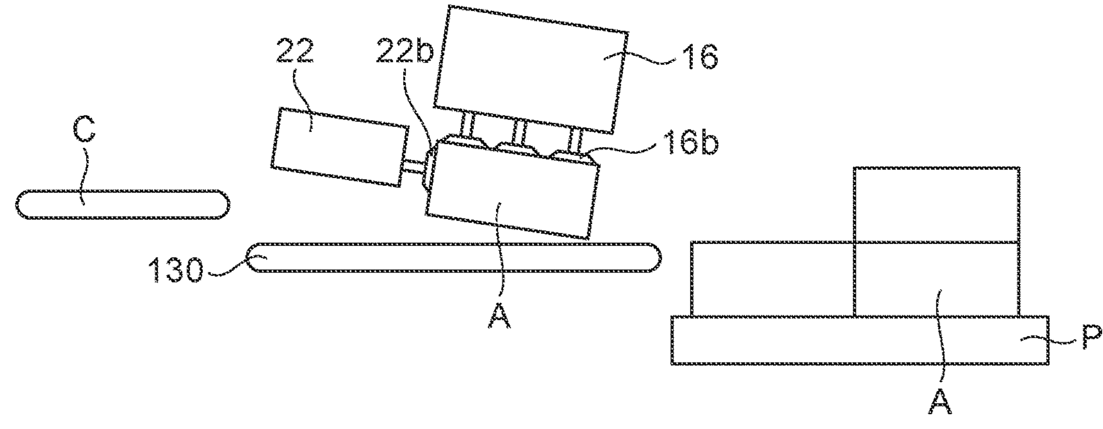

After step S118, the horizontal moving device 151 moves the suction hand 1 toward the conveyor 130 along the X-Y plane (step S121 in FIG. 12). Accordingly, as shown in FIG. 14C, the held article A is conveyed onto the conveyor 130. The side surface suction unit 22 ends the suction to the side surface of the article A (step S122). Specifically, the control unit 25 increases the pressure of the suction portion 22*b*. For example, the control unit 25 opens the inside of the suction portion 22*b* to the atmosphere.

The cylinder 19 moves the side surface suction unit 22 rearward (step S123). Accordingly, the side surface suction unit 22 is separated from the article A.

The control unit 25 determines whether the side surface of the article A suctioned by the side surface suction unit 22 is released (step S124). Whether the side surface is released is determined based on the pressure in the suction portion 22*b*. When the pressure of each of the suction portions 22*b* exceeds a preset threshold value, it is determined that the side surface is released.

When it is determined that the suctioned side surface is not released, the control unit 25 stands by. When the pressure of each of the suction portions 22*b* increases during the standby, the side surface is released. In addition, during the standby, the control unit 25 determines whether a preset time has elapsed from the end of the suction to the side surface (step S125). When the side surface is not released even after the set time has elapsed, the control unit 25 ends the first operation. The control unit 25 may notify that the suctioned side surface is not released.

When the suctioned side surface is released, the upper surface suction unit 16 ends the suction to the upper surface of the article A (step S126). Specifically, the control unit 25 increases the pressure of the suction portion 16*b*. For example, the control unit 25 opens the inside of the suction portion 16*b* to the atmosphere. The cylinder 21*a* of the drive mechanism 21 is opened (step S127).

The control unit 25 determines whether the upper surface of the article A suctioned by the upper surface suction unit 16 is released (step S128). Whether the upper surface is released is determined based on the pressure in the suction portion 16*b*. When the pressure of each of the suction portions 16*b* exceeds a preset threshold value, it is determined that the upper surface is released.

When it is determined that the suctioned upper surface is not released, the control unit 25 stands by. When the pressure of each of the suction portions 16*b* increases during the standby, the upper surface is released. In addition, during the standby, the control unit 25 determines whether a preset time has elapsed from the end of the suction to the upper surface (step S129). When the upper surface is not released even after the set time has elapsed, the control unit 25 ends the first operation. The control unit 25 may notify that the suctioned upper surface is not released.

Figure 15A:
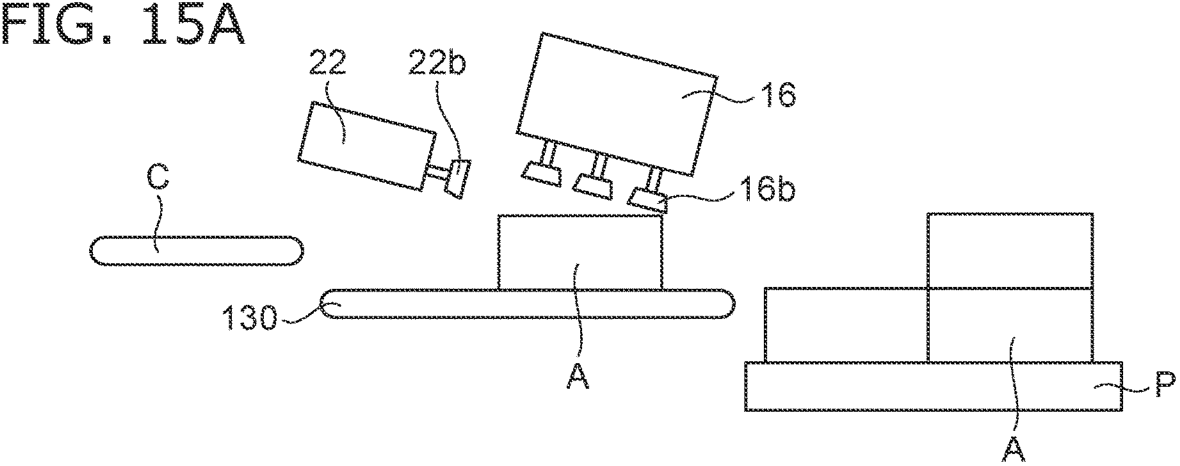
FIGS. 15A to 15C are schematic views showing the first operation.
Figure 15B:
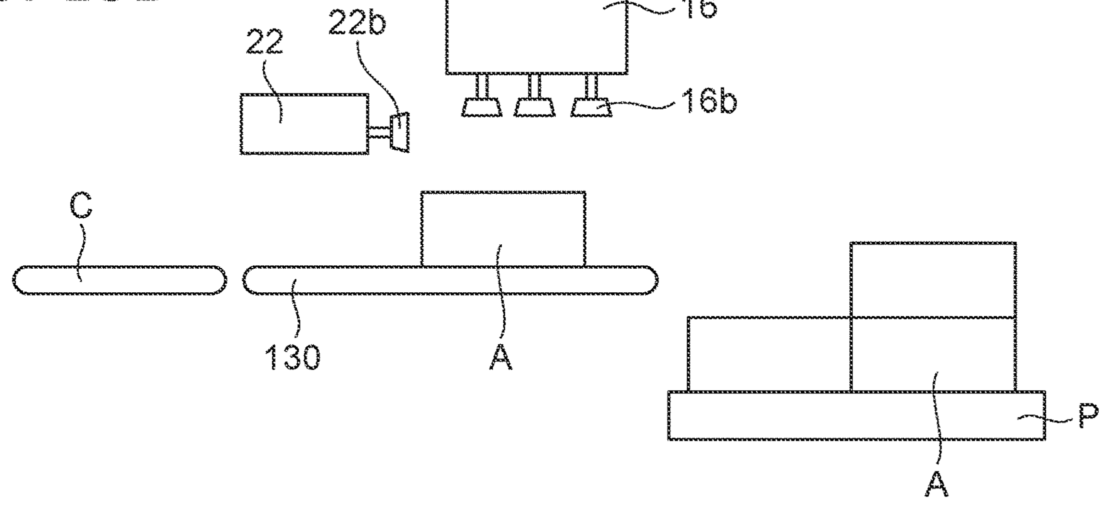
Figure 15C:
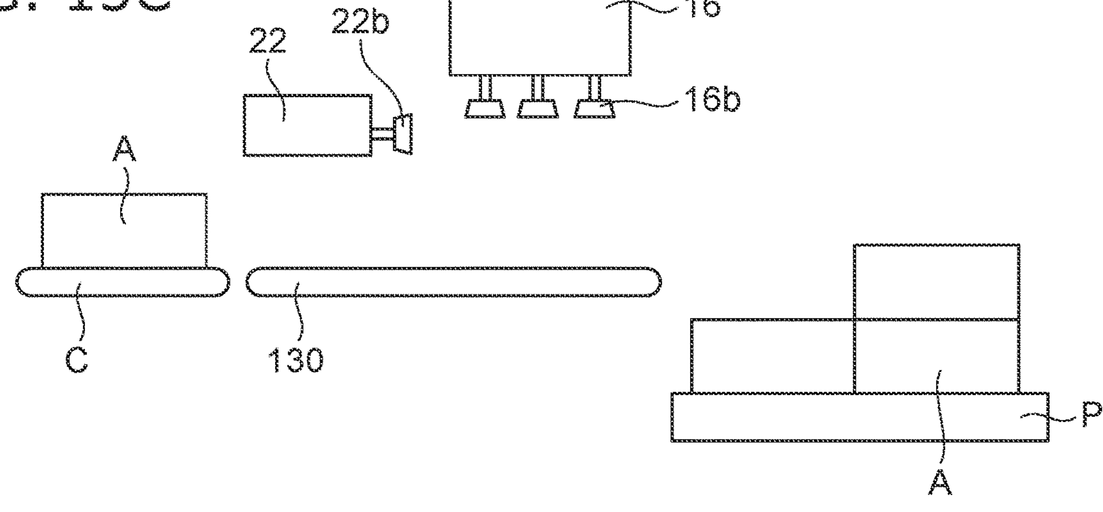

When the upper surface is released, as shown in FIG. 15A, the conveyed article A is placed on the conveyor 130. The inclination mechanism 12 operates the cylinder 12*a* such that a suction face of the upper surface suction unit 16 is horizontal (parallel to the X-Y plane) (step S130). As shown in FIG. 15B, the lifting-and-lowering device 152 lifts the suction hand 1 (step S131). As shown in FIG. 15C, the conveyor 130 conveys the placed article A to the conveyor C (step S131). The conveyor C conveys the article A to another place. The holding device 100 repeats the above-described operation until all the articles A on the pallet P are conveyed to the conveyor C.

Figure 16:
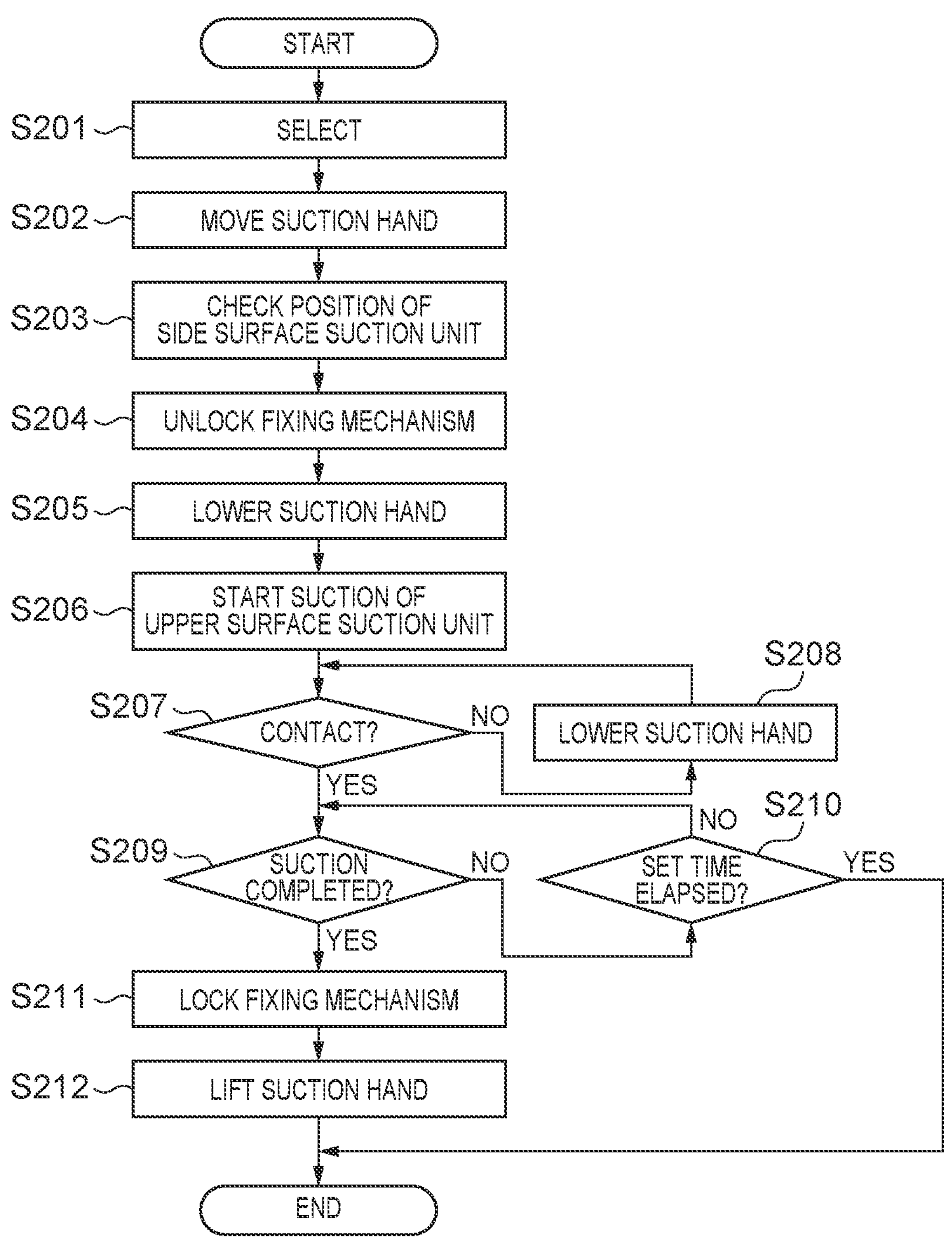
FIG. 16 is a flowchart showing a part of the second operation.
Figure 17:
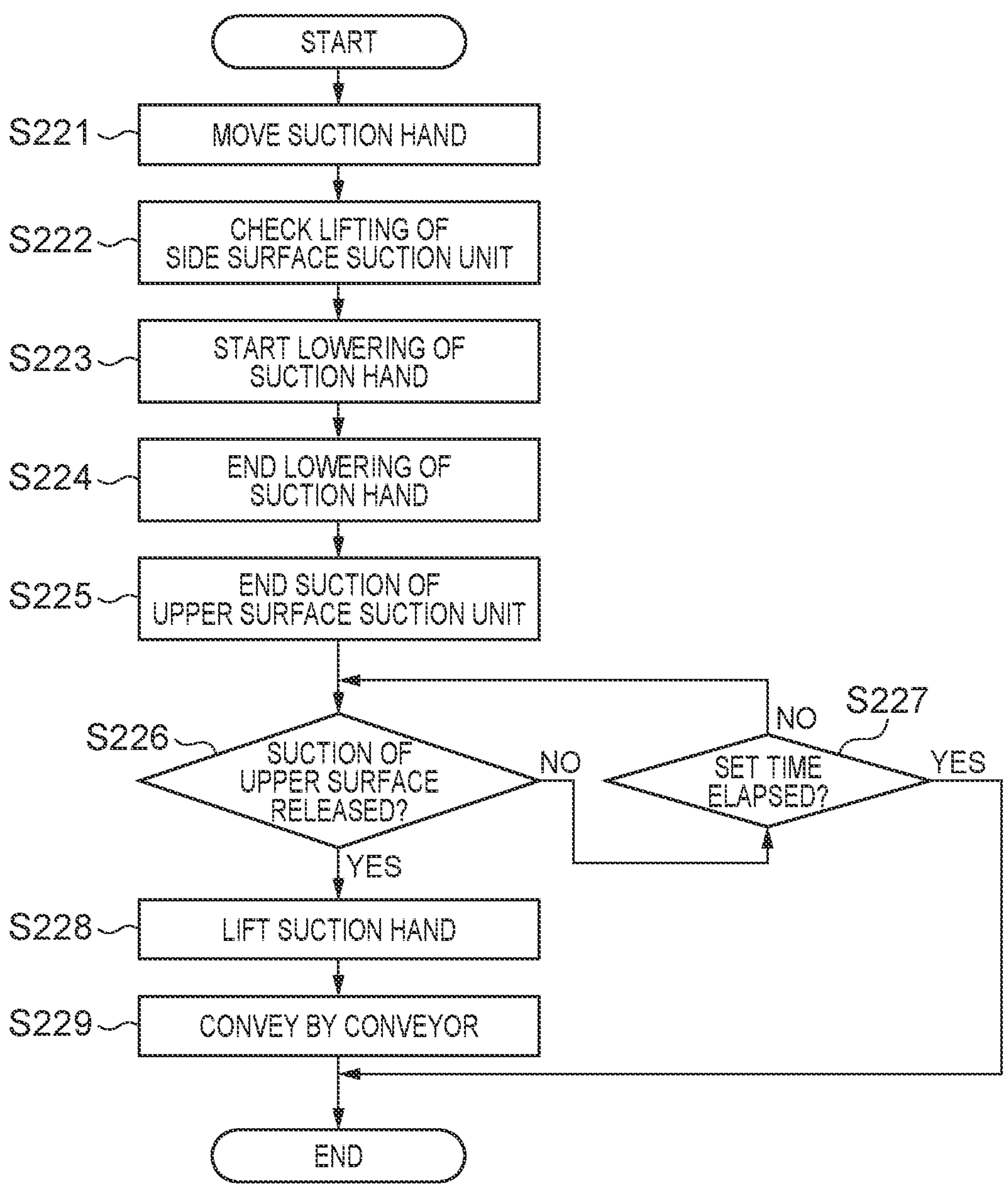
FIG. 17 is a flowchart showing another part of the second operation.

FIG. 16 is a flowchart showing a part of the second operation. FIG. 17 is a flowchart showing another part of the second operation. FIGS. 18A and 18B, FIGS. 19A to 19C, and FIGS. 20A to 20C are schematic views showing the second operation.

The second operation of the holding device 100 will be described with reference to FIGS. 16 to 20C.

First, the image-capturing device 120 captures an image of the multiple articles A on the pallet P. In the example shown in FIG. 18A, the multiple articles A in the second arrangement are placed in a stacked manner on the pallet P. Based on the obtained image, the control unit 25 selects an article to be held (step S201 in FIG. 16). In the second operation, the article A whose upper surface is located at a highest position is selected regardless of the position in the X-direction.

Figure 18A:
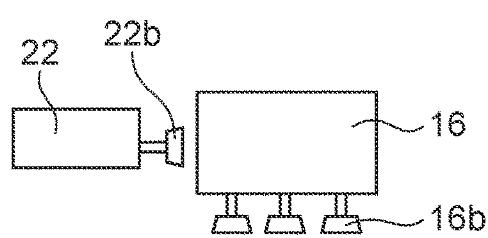
FIGS. 18A and 18B are schematic views showing the second operation.
Figure 18A:
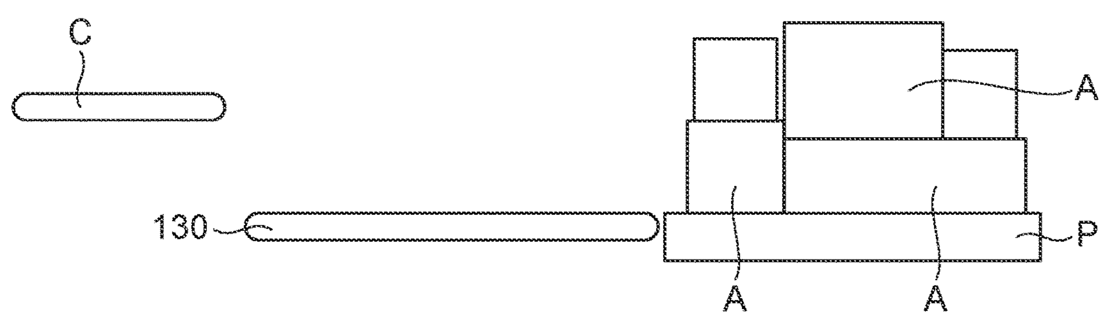
Figure 18B:
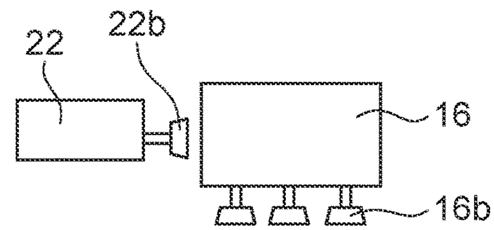
Figure 18B:
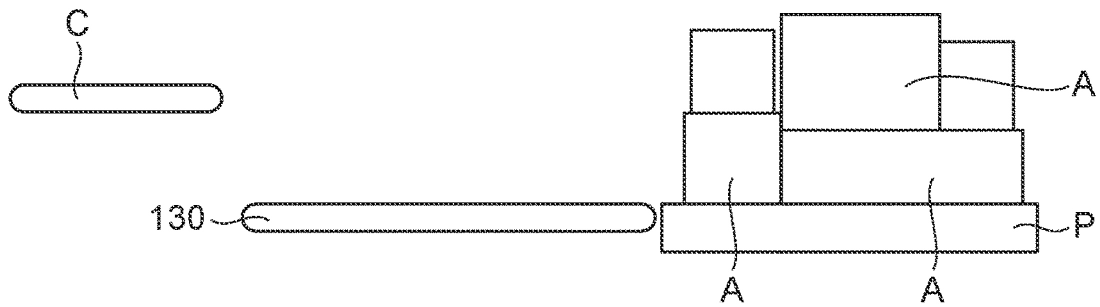

The horizontal moving device 151 moves the suction hand 1 along the X-Y plane (step S202), and positions the suction hand 1 above the selected article A as shown in FIG. 18B. The control unit 25 checks whether the side surface suction unit 22 is located at the second position (step S203). When the side surface suction unit 22 is not located at the second position, the control unit 25 operates the drive mechanism 21 to move the side surface suction unit 22 to the second position.

Figures 19A, 19B, 19C:
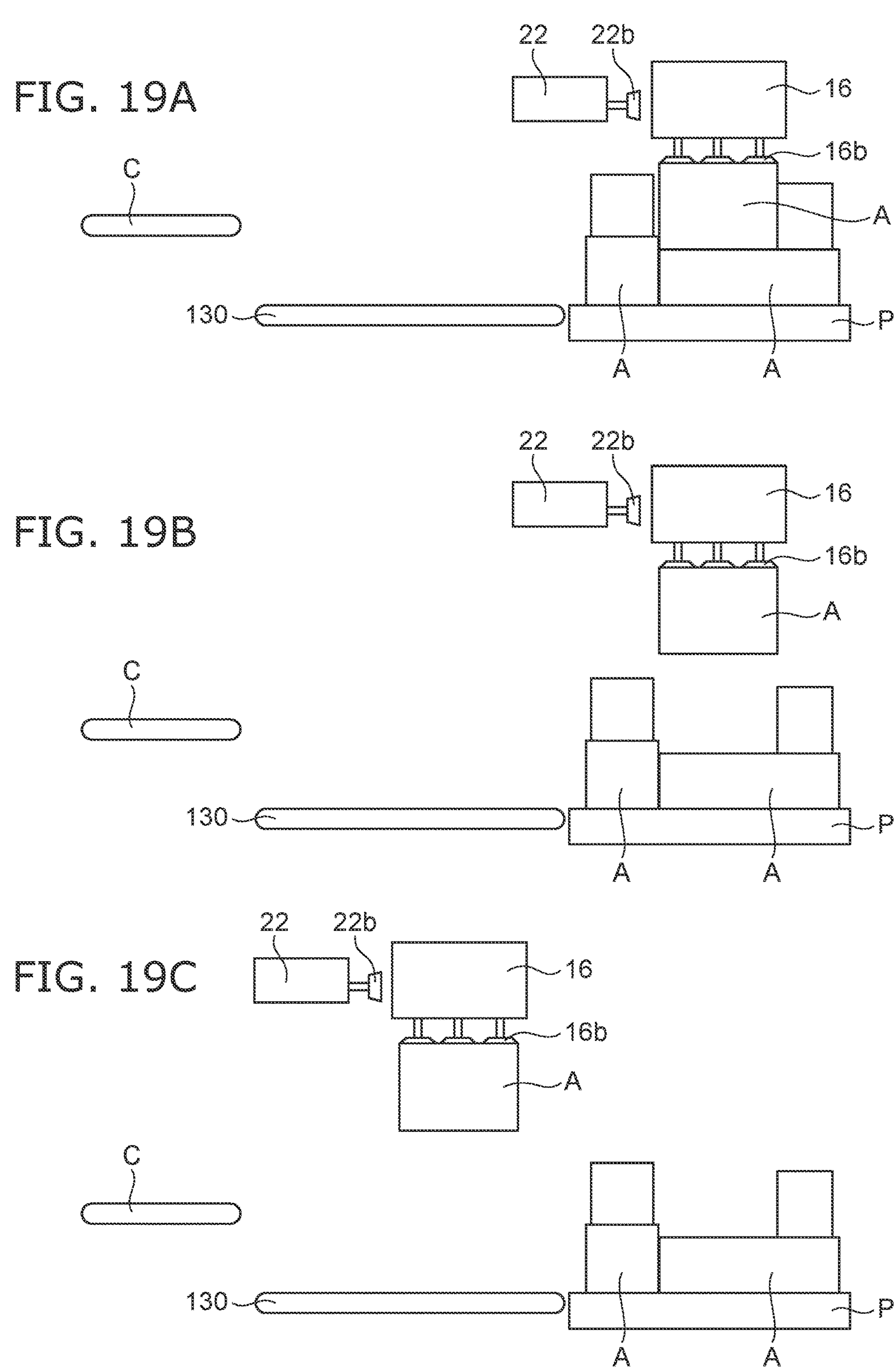
FIGS. 19A to 19C are schematic views showing the second operation.

The fixing mechanism 15 is set to the unlocked state (step S204), and the connection frame 14 is in a movable state. As shown in FIG. 19A, the lifting-and-lowering device 152 lowers the suction hand 1 toward the article A (step S205). The suction hand 1 is lowered to the position of the upper surface of the selected article A. The position of the upper surface of the article A is calculated by the control unit 25 based on the image. During the lowering of the suction hand 1, each of the multiple upper surface suction units 16 is movable in the Z-direction with respect to the base 11. Accordingly, when the upper surface suction unit 16 comes into contact with the article A, it is possible to prevent an excessive force from being applied to the upper surface suction unit 16.

The upper surface suction unit 16 starts suction of the upper surface of the article A (step S206). Specifically, the control unit 25 operates the negative pressure generating device 160 to exhaust the inside of the suction portion 16*b*. The control unit 25 determines whether the upper surface suction unit 16 is in contact with the article A (step S207). The contact is determined based on the detector 23. When it is determined that the upper surface suction unit 16 is not in contact with the article A, the lifting-and-lowering device 152 lowers the suction hand 1 again (step S208). After the execution of step S208, step S207 is executed again. Similarly to the first operation, a limit may be set for the number of times of execution of step S208.

When it is determined that the upper surface suction unit 16 is in contact with the article A, the control unit 25 determines whether the suction of the article A by the upper surface suction unit 16 is completed (step S209). Similarly to the first operation, whether the suction is completed is determined based on the pressure in the suction portion 16*b*. When it is determined that the suction is not completed, the suction by the upper surface suction unit 16 is continued. The control unit 25 determines whether a preset time has elapsed from the start of the suction (step S210). When the suction is not completed even after the set time has elapsed, the control unit 25 ends the second operation. The control unit 25 may notify that the suction by the upper surface suction unit 16 is not completed.

When the suction is completed, the fixing mechanism 15 is set to the locked state (step S211), and the position of the upper surface suction unit 16 in the suction hand 1 is fixed. As shown in FIG. 19B, the lifting-and-lowering device 152 lifts the suction hand 1 (step S212).

After step S212, the horizontal moving device 151 moves the suction hand 1 along the X-Y plane (step S221 in FIG. 17). As shown in FIG. 19C, the held article A is conveyed above the conveyor 130. The control unit 25 checks whether the side surface suction unit 22 is located at the second position (step S222). When the side surface suction unit 22 is not located at the second position, the control unit 25 operates the drive mechanism 21 to move the side surface suction unit 22 to the second position.

Figure 20A:
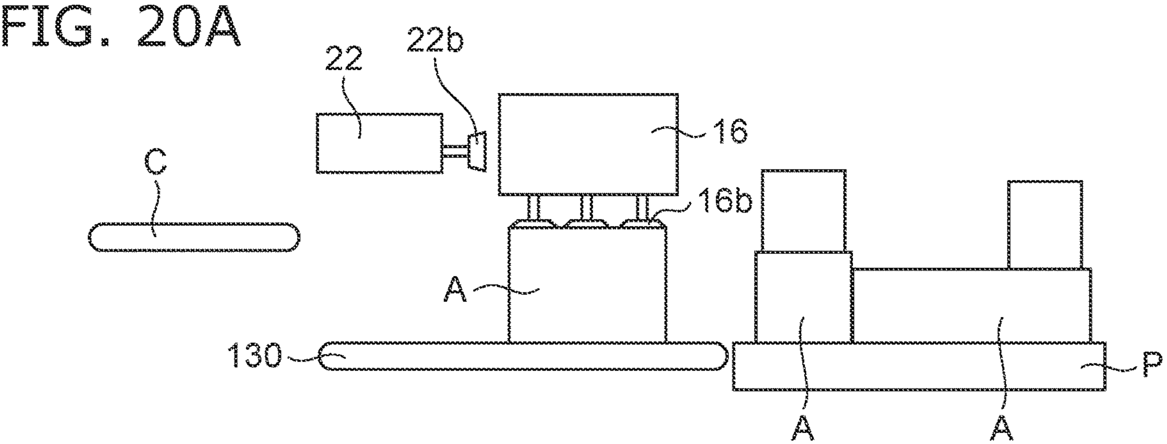
FIGS. 20A to 20C are schematic views showing the second operation.

The lifting-and-lowering device 152 starts to lower the suction hand 1 (step S223). As shown in FIG. 20A, when the position of the bottom surface of the held article A is lowered to a position of an upper surface of the conveyor 130, the lifting-and-lowering device 152 ends the lowering of the suction hand 1 (step S224). The position of the bottom surface of the article A is calculated by the control unit 25 based on the detection result of the detector 170.

The upper surface suction unit 16 ends the suction to the upper surface of the article A (step S225). Specifically, the control unit 25 increases the pressure of the suction portion 16*b*. For example, the control unit 25 opens the inside of the suction portion 16*b* to the atmosphere. The control unit 25 determines whether the upper surface of the article A suctioned by the upper surface suction unit 16 is released (step S226). Similarly to the first operation, whether the upper surface is released is determined based on the pressure in the suction portion 16*b*.

When it is determined that the suctioned upper surface is not released, the control unit 25 stands by. When the pressure of each of the suction portions 16*b* increases during the standby, the upper surface is released. In addition, during the standby, the control unit 25 determines whether a preset time has elapsed from the end of the suction to the upper surface (step S227). When the upper surface is not released even after the set time has elapsed, the control unit 25 ends the second operation. The control unit 25 may notify that the suctioned upper surface is not released.

Figure 20B:
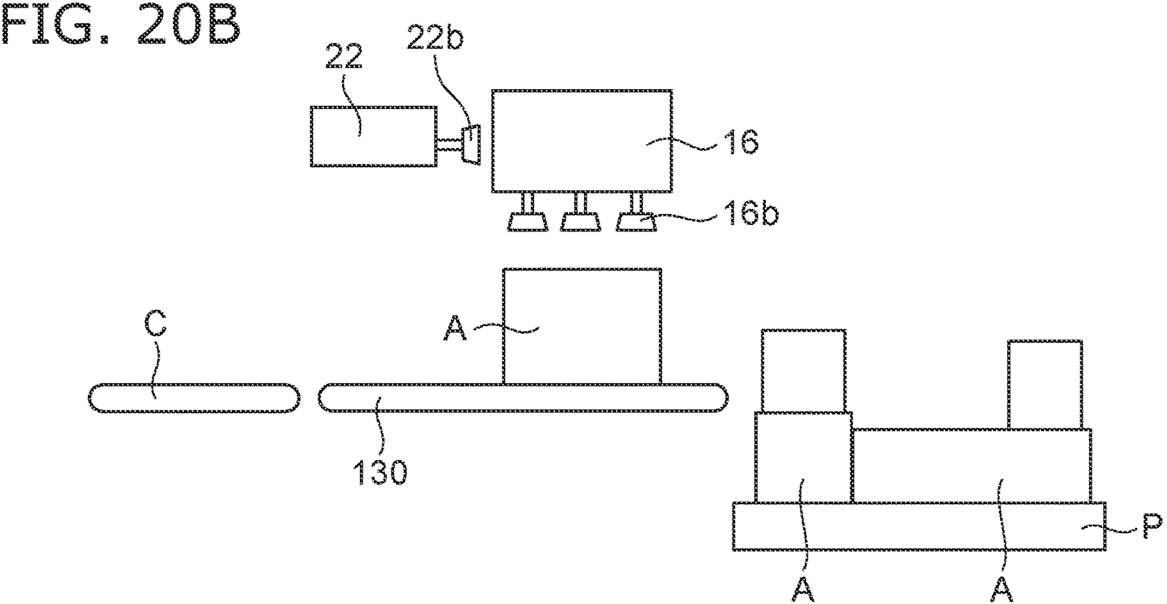
Figure 20C:
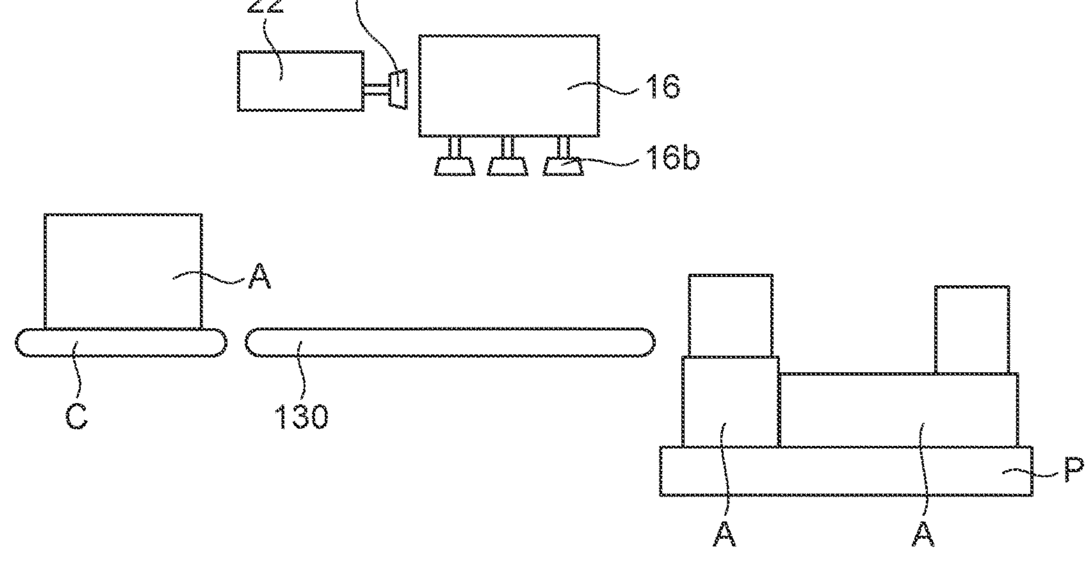

When the upper surface is released, as shown in FIG. 20B, the lifting-and-lowering device 152 lifts the suction hand 1 (step S228). As shown in FIG. 20C, the conveyor 130 conveys the placed article A to the conveyor C (step S229). The conveyor C conveys the article A to another place. The holding device 100 repeats the above-described operation until all the articles A on the pallet P are conveyed to the conveyor C.

Data indicating the arrangement of the articles A on the pallet P may be input by a user or may be transmitted to the control unit 25 by a communication method. For example, the control unit 25 receives data indicating the arrangement. The control unit 25 switches the position of the side surface suction unit 22 based on the received data.

The holding device 100 according to the embodiment includes the suction hand 1. Therefore, a wider variety of articles can be stably held. In addition, since the increase in the size of the upper surface suction unit 16 is prevented, it is possible to prevent the upper surface suction unit 16 from interfering with other elements.

In the first arrangement in which the sizes of the multiple articles A are regular, as shown in FIG. 10 and FIGS. 13A to 15C, the heights of the upper surfaces of the respective articles A are the same in the same stage. For example, items of the same type are packed in each article A. In this case, by conveying the article A in the foreground first, the article A can be more stably held by both the upper surface suction unit 16 and the side surface suction unit 22. In addition, as compared with a case where the article A is held by only one of the upper surface suction unit 16 and the side surface suction unit 22, it is possible to prevent a large force from being locally applied to the article A. Accordingly, damage to the article A can be prevented. For the article A in the first arrangement, both the upper surface suction unit 16 and the side surface suction unit 22 are used.

In the second arrangement in which the sizes of the multiple articles A are irregular, as shown in FIGS. 18A to 20C, the positions of the upper surfaces of the articles A adjacent to each other in the X-Y plane may be different from each other. For example, the articles A are delivery parcels. In this case, when the upper surface suction unit 16 is brought close to the article A whose upper surface is located at a lower position, a part of the holding device 100 may interfere with another article A whose upper surface is located at a higher position, and the other article A may be damaged. Therefore, the holding device 100 holds the article A whose upper surface is located at a highest position during conveyance. For the article A in the second arrangement, only the upper surface suction unit 16 is used, and the side surface suction unit 22 is not used.

Conventionally, different holding devices are used in the case where the article A in the first arrangement is conveyed and the case where the article A in the second arrangement is conveyed. That is, a holding device including the upper surface suction unit 16 and the side surface suction unit 22 is used for the article A in the first arrangement. A holding device including only the upper surface suction unit 16 is used for the article A in the second arrangement. However, in the conventional method, it is necessary to allocate the pallet to the holding device according to the type of the holding device and the arrangement of the article. Therefore, management becomes complicated. In addition, an operating rate of the holding device may also decrease.

Regarding such a problem, the holding device 100 according to the embodiment performs the first operation of holding the article A by both the upper surface suction unit 16 and the side surface suction unit 22, and the second operation of holding the article A only by the upper surface suction unit 16. By selectively executing either the first operation or the second operation, the article A can be held regardless of the arrangement. According to the embodiment, convenience of the holding device 100 can be improved. Accordingly, for example, an operating rate of the holding device 100 can be improved.

Favorably, the holding device 100 switches between the first state in which the side surface suction unit 22 is located at the first position and the second state in which the side surface suction unit 22 is located at the second position. When the article A in the second arrangement is held, the side surface suction unit 22 may interfere with an article A other than the object to be held. When the side surface suction unit 22 is located at the second position when the second operation is executed, it is possible to reduce the possibility that the side surface suction unit 22 interferes with the other article A.

Figure 21:
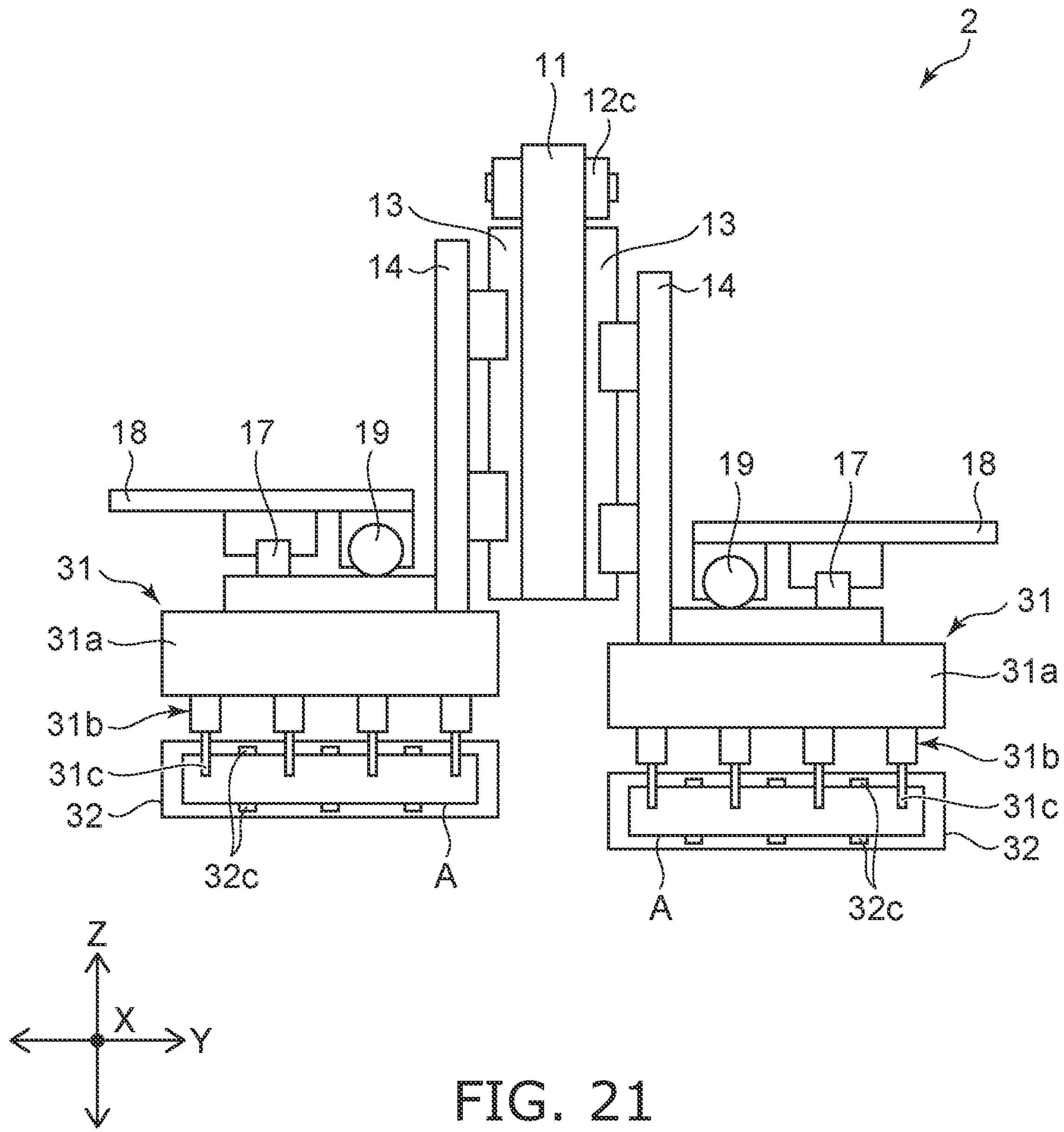
FIG. 21 is a front view schematically showing a hand according to another embodiment.
Figure 22:
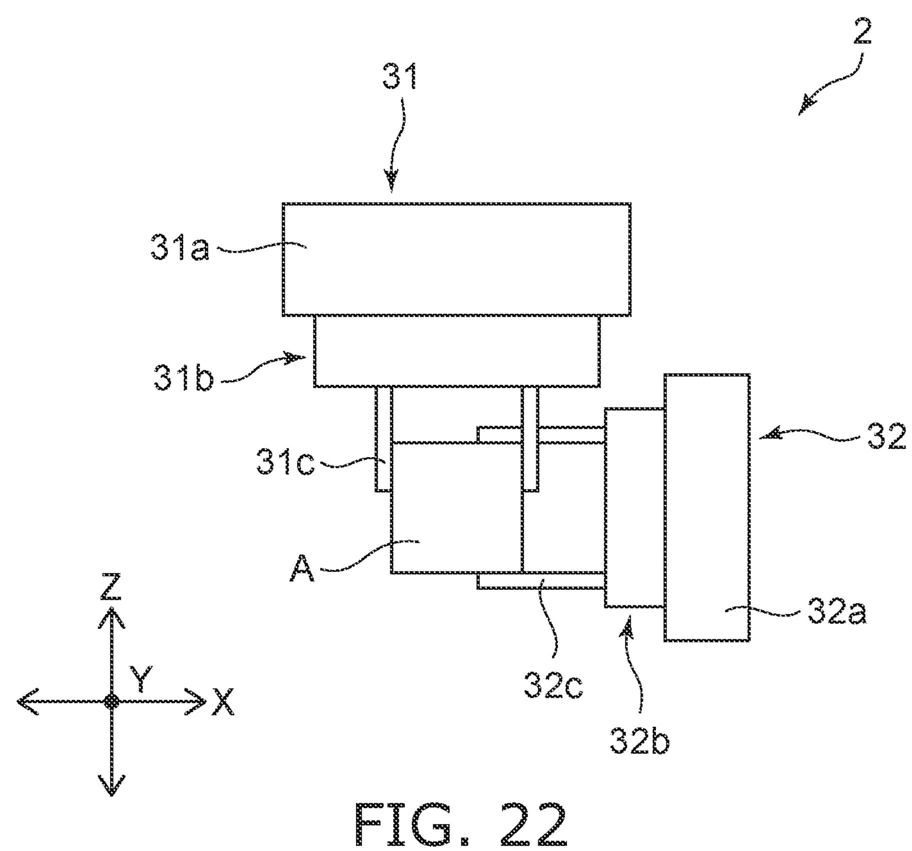
FIG. 22 is a side view schematically showing the hand according to the other embodiment.

FIG. 21 is a front view schematically showing a hand according to another embodiment. FIG. 22 is a side view schematically showing a hand according to another embodiment.

FIGS. 21 and 22 show a pinching hand 2 as another example of the hand according to the embodiment. The pinching hand 2 holds an article by pinching. Compared to the suction hand 1, the pinching hand 2 comprises a holding unit 31 (another example of the first holding unit) and a holding unit 32 (another example of the second holding unit) instead of the upper surface suction unit 16 and the side surface suction unit 22. A structure similar to that of the suction hand 1 can be applied for other structures of the pinching hand 2.

As shown in FIG. 21, the holding unit 31 includes a housing 31*a* and a pinching mechanism 31*b* (another example of the first holding section). The pinching mechanism 31*b* includes a plurality of rod-shaped supporting portions 31*c*. Each supporting portion 31*c* extends along the Z direction and is separated from each other in the X direction. The housing 31*a* includes an actuator for driving the supporting portions 31*c*. The pinching mechanism 31*b* can change the distance in the X direction between the supporting portions 31*c*. By shortening the distance between the supporting portions 31*c* in a state in which a part of the article A is positioned between the supporting portions 31*c*, the article A can be pinched.

A plurality of holding units 31 are provided in the Y direction. Each holding unit 31 is independently movable in the Z direction. Each holding unit 31 includes a plurality of pinching mechanisms 31*b*.

As shown in FIG. 22, the holding unit 32 includes a housing 32*a* and a pinching mechanism 32*b* (another example of the second holding section). The pinching mechanism 32*b* includes a plurality of rod-shaped supporting portions 32*c*. Each supporting portion 32*c* extends along the X direction and is separated from each other in the Z direction. The housing 32*a* includes an actuator for driving the supporting portions 32*c*. The pinching mechanism 32*b* can change the distance in the Z direction between the supporting portions 32*c*. By shortening the distance between the supporting portions 32*c* in a state in which a part of the article A is positioned between the supporting portions 32*c*, the article A can be pinched.

A plurality of holding units 32 are provided in the Y direction. Each holding unit 32 is independently movable in the X direction. Each holding unit 32 includes a plurality of pinching mechanisms 32*b*.

As with the hand 1, the hand 2 includes the base 11, the inclination mechanism 12, the linear guide 13, the connection frame 14, the fixing mechanism 15, the linear guide 17, the connection plate 18, the cylinder 19, the link mechanism 20, the drive mechanism 21, the detector. 23, the control unit 25, and the like. Therefore, the plurality of holding units 32 are respectively connected to the plurality of holding units 31. The positions of the plurality of holding units 32 in the Z direction are respectively variable according to the positions of the plurality of holding units 31 in the Z direction. The plurality of drive mechanisms 21 can respectively change the positions of the plurality of holding units 32 in the Z direction by rotating the plurality of link mechanisms 20 around the Y direction. The inclination mechanism 12 can incline the holding unit 31 and the holding unit 32 with respect to a plane along the Y direction and the X direction. The fixing mechanism 15 can fix the position of the holding unit 31 in the Z direction.

In the illustrated example, the holding unit 31 includes the plurality of pinching mechanisms 31*b*, and the holding unit 32 includes the plurality of pinching mechanisms 32*b*. The present invention is not limited to the illustrated example. The holding unit 31 may include only one pinching mechanism 31*b*. The holding unit 32 may include only one pinching mechanism 32*b*. The holding device 100 may include the pinching hand 2 instead of the suction hand 1.

Figure 23:
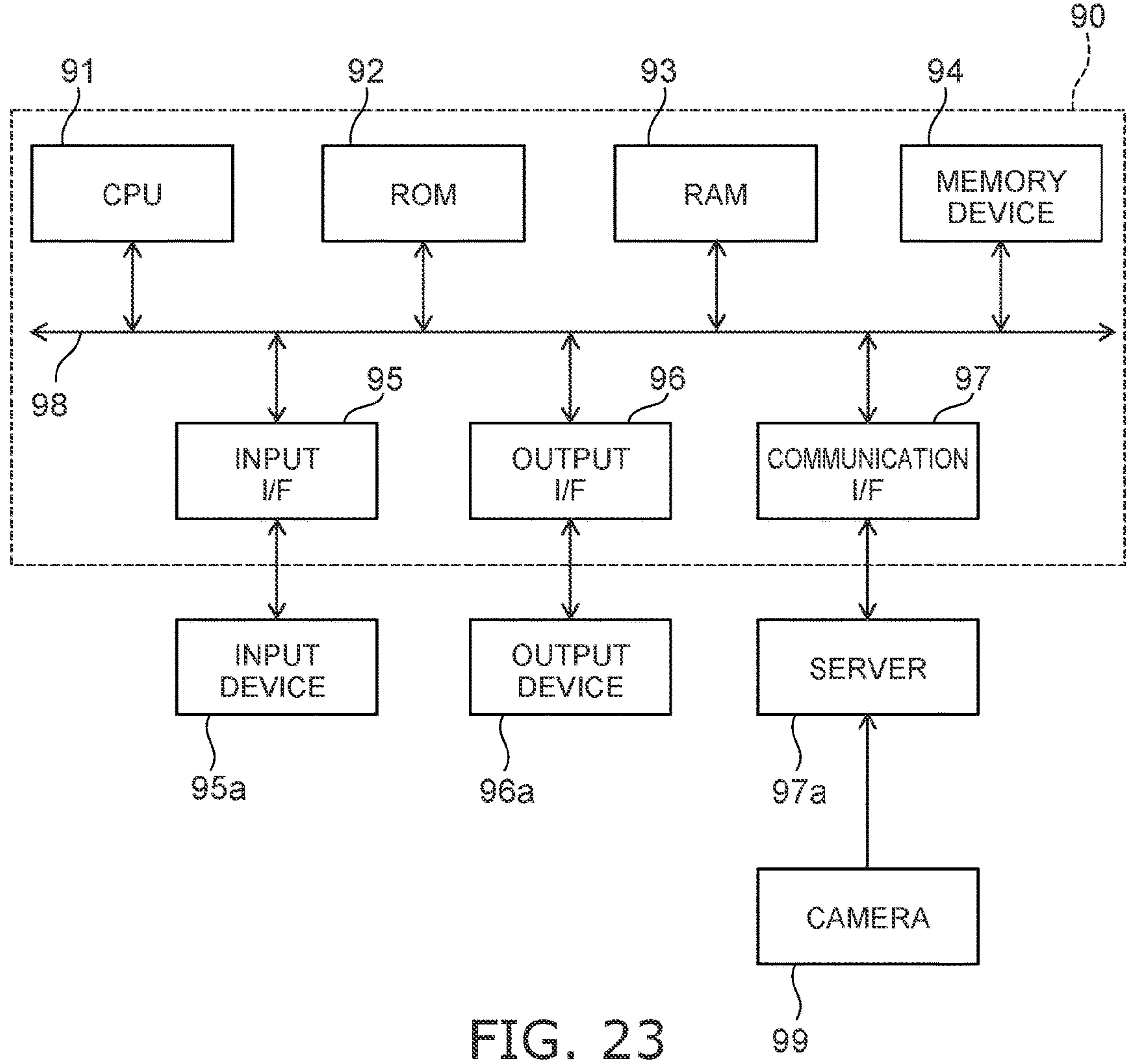
FIG. 23 is a schematic view showing a hardware configuration.

FIG. 23 is a schematic view showing a hardware configuration.

The control unit 25 includes, for example, the hardware configuration shown in FIG. 23. A processing device 90 shown in FIG. 23 includes a CPU 91, a ROM 92, a RAM 93, a memory device 94, an input interface 95, an output interface 96, and a communication interface 97.

The ROM 92 stores a program configured to control an operation of a computer. The ROM 92 stores a program necessary for the computer to implement the above-described processes. The RAM 93 functions as a memory area onto which the program stored in the ROM 92 is loaded.

The CPU 91 includes a processing circuit. The CPU 91 executes a program stored in at least one of the ROM 92 and the memory device 94 using the RAM 93 as a work memory. During the execution of the program, the CPU 91 controls each configuration via a system bus 98 to execute various processes.

The memory device 94 stores data necessary for the execution of the program and data obtained by the execution of the program.

The input interface (I/F) 95 connects the processing device 90 and an input device 95*a*. The input I/F 95 is, for example, a serial bus interface such as a USB. The CPU 91 can read various types of data from the input device 95*a* via the input I/F 95.

The output interface (I/F) 96 connects the processing device 90 and an output device 96*a*. The output I/F 96 is, for example, a video output interface such as a digital visual interface (DVI) or a high-definition multimedia interface (HDMI (registered trademark)). The CPU 91 can transmit data to the output device 96*a* via the output I/F 96 and cause the output device 96*a* to display an image.

The communication interface (I/F) 97 connects a server 97*a* outside the processing device 90 to the processing device 90. The communication I/F 97 is, for example, a network card such as a LAN card. The CPU 91 can read various types of data from the server 97*a* via the communication I/F 97. A camera 99 captures an image of the article and stores the image in the server 97*a*. The camera 99 functions as the image-capturing device 120.

The memory device 94 includes one or more selected from a hard disk drive (HDD) and a solid state drive (SSD). The input device 95*a* includes one or more selected from a mouse, a keyboard, a microphone (voice input), and a touch pad. The output device 96*a* includes one or more selected from a monitor and a projector. A device having functions of both the input device 95*a* and the output device 96*a*, such as a touch panel, may be used.

Processes of the various types of data described above may be recorded on a magnetic disk (a flexible disk, a hard disk, or the like), an optical disk (CD-ROM, CD-R, CD-RW, DVD-ROM, DVD±R, DVD±RW, or the like), a semiconductor memory, or another non-transitory computer-readable recording medium as the program that can be executed by the computer.

For example, information recorded in the recording medium can be read by the computer (or an embedded system). In the recording medium, a recording format (storage format) is set as desired. For example, the computer reads the program from the recording medium and causes the CPU to execute instructions described in the program based on the program. In the computer, acquisition (or reading) of the program may be performed through a network.

According to the embodiment described above, the hand, the holding device, and the cargo-handling system capable of stably holding a wider variety of articles are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A hand comprising:

a first holding unit including a plurality of first holding portions capable of holding an object, each of the plurality of first holding portions includes a first rod extending along a first direction and a first suction pad provided at a tip end of the first rod, the first direction being along a vertical direction, a plurality of the first holding units being provided in a second direction and being movable independently of each other in the first direction, the second direction crossing the first direction; and a second holding unit being movable in a third direction crossing a plane parallel to the first direction and the second direction, the second holding unit including a plurality of second holding portions capable of holding the object, each of the plurality of second holding portions includes a second rod extending along the third direction and a second suction pad provided at a tip end of the second rod, a plurality of the second holding units are provided in the second direction, wherein, each of the plurality of second holding units is connected, via a respective link mechanism, to a corresponding one of the plurality of first holding units, such that a position in the first direction of each of the plurality of second holding units varies in accordance with a position in the first direction of the corresponding first holding unit, and wherein, if the plurality of first holding units respectively contact objects at different heights, positions in the first direction of the first holding units are mutually different, thereby causing positions in the first direction of the second holding units to be mutually different.

2. The hand according to claim 1, wherein a plurality of the second holding units are provided in the second direction.

3. The hand according to claim 2, further comprising:

a plurality of actuators configured to drive the plurality of second holding units in the third direction, respectively.

4. The hand according to claim 2, further comprising:

a plurality of drive mechanisms each including a cylinder and being configured to change the position of each of the plurality of second holding units in the first direction with respect to the plurality of first holding units, respectively.

5. The hand according to claim 4, wherein each of the plurality of link mechanisms including a link and a rotation shaft, wherein the plurality of second holding units are respectively coupled to the plurality of link mechanisms so as to be rotatable around the second direction, and wherein the plurality of drive mechanisms are configured to change the position of each of the plurality of second holding units in the first direction by rotating each of the plurality of link mechanisms around the second direction.

6. The hand according to claim 5, wherein the plurality of drive mechanisms include a plurality of cylinders respectively connected to the plurality of link mechanisms.

7. The hand according to claim 1, further comprising:

an inclination mechanism including a cylinder and being configured to incline the plurality of first holding units and the second holding unit with respect to a plane along the second direction and the third direction.

8. The hand according to claim 1, further comprising:

a plurality of fixing mechanisms including a cylinder and being configured to fix positions of the plurality of first holding units in the first direction, respectively.

9. A holding device comprising:

the hand according to claim 1; and an actuator configured to move the hand along the first direction, the second direction, or the third direction.

10. A cargo-handling system comprising:

the hand according to claim 1;

an actuator configured to move the hand along the first direction, the second direction, or the third direction; and a conveyor on which an article held by the hand is placed, the conveyor including a motor and being configured to move the placed article using the motor.

11. The system according to claim 10, further comprising:

a lifting-and-lowering device configured to move the conveyor along the first direction.

12. The system according to claim 10, further comprising:

a camera configured to capture an image of a plurality of the articles placed in a stacked manner.

* * * * *